(12) United States Patent
Oshima et al.

(10) Patent No.: US 6,984,281 B2
(45) Date of Patent: Jan. 10, 2006

(54) INTERMEDIATE TRANSFER RECORDING MEDIUM, PRINT, AND METHOD FOR IMAGE FORMATION THEREBY

(75) Inventors: Katsuyuki Oshima, Shinjuku-ku (JP); Kozo Odamura, Shinjuku-ku (JP); Takayuki Imai, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 104 days.

(21) Appl. No.: 10/113,884

(22) Filed: Apr. 2, 2002

(65) Prior Publication Data

US 2002/0195005 A1   Dec. 26, 2002

(30) Foreign Application Priority Data

Apr. 2, 2001   (JP)   ............................. 2001-102762
Apr. 2, 2001   (JP)   ............................. 2001-102763
Apr. 2, 2001   (JP)   ............................. 2001-102764

(51) Int. Cl.
*B41M 5/035*   (2006.01)
*B41M 5/30*   (2006.01)
*B41M 5/38*   (2006.01)

(52) U.S. Cl. ................... 156/235; 156/240; 428/32.51; 503/227

(58) Field of Classification Search ................ 8/471; 428/32.51; 503/227; 156/234, 235, 239, 156/240

See application file for complete search history.

(56) References Cited

U.S. PATENT DOCUMENTS 4,923,847 A * 5/1990 Ito et al. ..................... 503/227
5,260,256 A * 11/1993 Takahara et al. ............ 503/227

* cited by examiner

*Primary Examiner*—Bruce H. Hess
(74) *Attorney, Agent, or Firm*—Oliff & Berridge, PLC

(57) ABSTRACT

There is provided a print which has been produced by providing an intermediate transfer recording medium comprising a substrate film and a transfer portion, comprising at least a receptive layer, provided separably on the substrate film, forming a thermal transfer image onto the transfer portion, and retransferring the transfer portion onto an object while accurately and stably forming a non-transferred portion onto a part of the object and, in addition, does not increase a production cost for providing a final print. The intermediate transfer recording medium comprises a substrate film and a transfer portion comprising at least a receptive layer, the transfer portion being provided separably on the substrate film. The print has on its at least one side a transfer portion-non-retransferred portion.

8 Claims, 8 Drawing Sheets

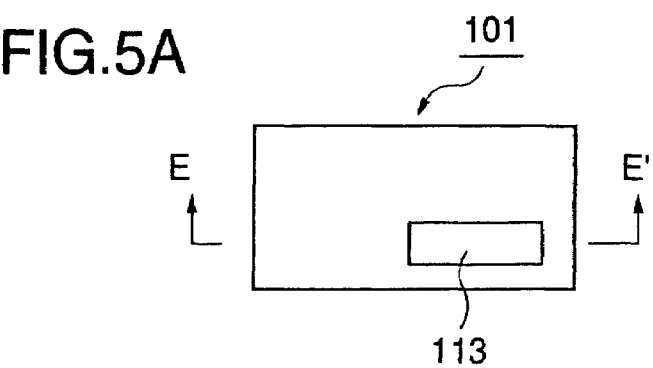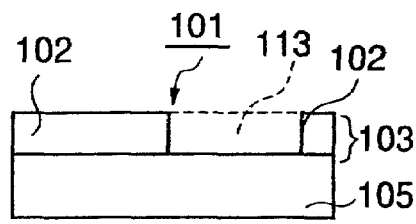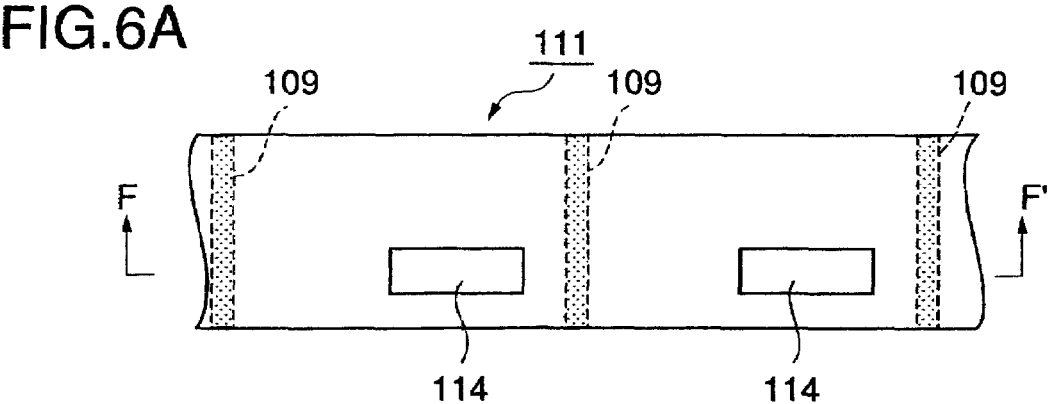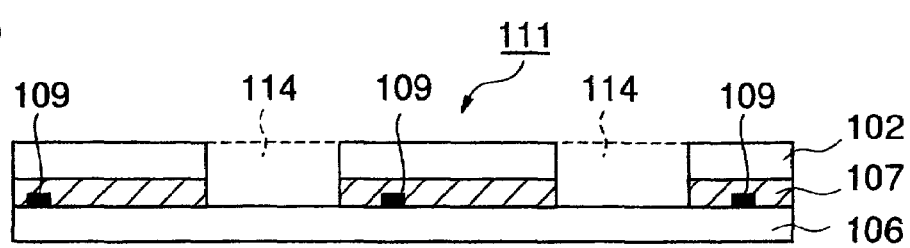

INTERMEDIATE TRANSFER RECORDING MEDIUM, PRINT, AND METHOD FOR IMAGE FORMATION THEREBY

BACKGROUND OF THE INVENTION

1. Field of the Invention

The present invention relates to an intermediate transfer recording medium comprising a substrate film and a transfer portion, which is provided separately on the substrate film and comprises at least a receptive layer, a print formed by providing the intermediate transfer recording medium, thermally transferring an image onto the transfer portion, and then retransferring the transfer portion onto an object, and a method for image formation using the intermediate transfer recording medium.

2. Prior Art

Thermal transfer has become extensively used as a simple printing method. The thermal transfer is a method which comprises the steps of: putting a thermal transfer sheet, comprising a colorant layer provided on one side of a substrate sheet, on top of a thermal transfer image-receiving sheet optionally provided with an image-receptive layer; and image-wise heating the backside of the thermal transfer sheet by heating means such as a thermal head to selectively transfer the colorant contained in the colorant layer to form an image on the thermal transfer image-receiving sheet.

Thermal transfer methods are classified into thermal ink transfer (hot melt-type thermal transfer) and thermal dye sublimation transfer (sublimation-type thermal transfer). The thermal ink transfer is a method for image formation wherein a thermal transfer sheet comprising a substrate sheet, such as a PET film, bearing thereon a hot-melt ink layer, formed of a dispersion of a colorant, such as a pigment, in a binder, such as a hot-melt wax or resin, is provided and energy according to image information is applied to heating means such as a thermal head to transfer the colorant together with the binder onto a thermal transfer image-receiving sheet such as paper or plastic sheets. Images produced by the thermal ink transfer have high density and possess high sharpness and are suitable for recording binary images of characters or the like.

On the other hand, the thermal dye sublimation transfer is a method for image formation which comprises the steps of: providing a thermal transfer sheet comprising a substrate sheet, such as a PET film, bearing thereon a dye layer formed of a dye, which is mainly thermally transferred by sublimation, dissolved or dispersed in a resin binder; and applying energy according to image information to heating means such as a thermal head to transfer only the dye onto a thermal transfer image-receiving sheet comprising a substrate sheet, such as paper or a plastic, optionally provided with a dye-receptive layer. The thermal dye sublimation transfer can regulate the amount of the dye transferred according to the quantity of energy applied and thus can form gradation images of which the image density has been regulated dot by dot of the thermal head. Further, since the colorant used is a dye, the formed image is transparent, and the reproduction of intermediate colors produced by superimposing different color dyes on top of each other or one another is excellent. Accordingly, high-quality photograph-like full color images can be formed with excellent reproduction of intermediate colors by transferring different color dyes, such as yellow, magenta, cyan, and black, onto a thermal transfer image-receiving sheet, so as to superimpose the color dyes on top of each other or one another, from a thermal transfer sheet of the different colors.

Thermal transfer image-receiving sheets on which images will be formed by these thermal transfer methods have various practical applications. Representative examples of applications include proof sheets, and recording sheets for output images, output plans or designs drawn by CAD/CAM or the like, or images output from a variety of medical analyzers or measuring instruments such as CT scanners and endoscopic cameras. They can also be used as the alternative of instant photographs, and as paper for producing identity certifications, ID cards, credit cards, and other cards on which facial photographs or the like are printed, or for producing synthetic or memorial photographs which are taken at amusement facilities such as recreation parks, game centers, museums, aquariums and the like. The diversification of applications has led to an increasing demand for the thermal transfer of an image on any desired object. A method has been proposed, as one method for meeting this demand, wherein a colorant such as a dye or a pigment is transferred, from a thermal transfer sheet comprising a dye layer or a hot-melt ink layer, onto a receptive layer in an intermediate transfer recording medium comprising the receptive layer separably provided on a substrate to form an image on the receptive layer and, thereafter, the intermediate transfer recording medium is heated to transfer the receptive layer, with the image formed thereon, onto an object (Japanese Patent Laid-Open No. 238791/1987 or the like).

Since the use of the intermediate transfer recording medium permits the receptive layer to be transferred onto an object, this method is preferably used, for example, for objects, onto which a colorant is less likely to be transferred making it impossible to form high-quality images directly on them, and objects which are likely to be fused to the colorant layer at the time of thermal transfer. Therefore, the intermediate transfer recording medium is preferably used in the preparation of passports or other identity certifications, credit cards/ID cards, or other prints.

When a receptive layer is transferred onto an object from the above intermediate transfer recording medium, the transfer of a simple shape in a full density blotted form having an outer shape of a quadrangle, a circle or the like poses no severe problem. On the other hand, for example, when a void portion is provided in the transfer portion or when the outer edge shape is complicate, there occurs a problem that the edge of the receptive layer transferred onto the object is not sharp, and a portion not to be transferred is transferred, or a portion to be transferred is not transferred, resulting in unstable transfer of the receptive layer.

In particular, when the receptive layer in its portion not to be transferred is, for example, the place for writing of address, name or the like, or the place for sealing of a person, who has written the address, name or the like, or an issuer, the transfer of the receptive layer onto that portion even to a small extent renders the contents of the writing or the seal unsharp and thus poses a severe problem that the contents of the writing or the seal is illegible. To overcome the problem of unstability of the transfer of the receptive layer, a method is considered effective wherein, after the receptive layer is once transferred in a simple form, such as a quadrangle or a circle, a specialty layer, which permits writing and sealing thereon, is additionally provided by printing or the like. In this case, however, the provision of the additional specialty layer is troublesome and labor intensive and thus disadvantageously results in very high production cost.

Accordingly, it is an object of the present invention to solve the above problems of the prior art and to provide an intermediate transfer recording medium which comprises a substrate film and, separably provided on the substrate film, a transfer portion comprising at least a receptive layer, and, after the thermal transfer of an image onto the transfer portion, can retransfer the transfer portion onto an object while forming a nontransferred portion on a part of the object with high accuracy in a stable manner and, in addition, does not increase a production cost for providing a final print, and to provide a method for image formation using the intermediate transfer recording medium.

SUMMARY OF THE INVENTION

According to the present invention, there is provided a print with an image formed thereon using an intermediate transfer recording medium, the intermediate transfer recording medium comprising a substrate film and a transfer portion, said transfer portion comprising at least a receptive layer, said transfer portion having been provided separably on the substrate film, said print having, on its at least one side, a portion on which the transfer portion has not been retransferred. According to this construction, in the intermediate transfer recording medium in its transfer portion, a portion free from the transfer portion (a void portion) is provided at a position corresponding to a sign panel, an IC chip, or a magnetic stripe portion in the print, or a design portion, such as a logo or a hologram, which has been previously printed on the object. The portion except for the void portion is retransferred onto the object to produce a print. When the transfer portion-non-retransferred portion is for a sign panel, an IC chip, a magnetic stripe or the like, a deterioration in performance upon the post treatment of that portion can be prevented. On the other hand, in the portion of a design, such as a logo or a hologram, the transfer of the transfer portion deteriorates the transparency (increases the opaqueness), leading to lowered quality. For this reason, the above means for solving the problem has been provided.

In this connection, it should be noted that the sign panel portion is a portion where hand writing is carried out with an writing instrument, such as a ballpoint pen, numbering is carried out with a stamping ink, or seal is provided using a vermilion inkpad or a stamping ink.

Further, the print of the present invention is characterized by being produced by transferring a masking layer onto any desired position of the transfer portion and then retransferring the transfer portion in the intermediate transfer recording medium onto an object, the print having a transfer portion-non-retransferred portion corresponding to the masking layer-transferred portion in the intermediate transfer recording medium. In this print, when a masking layer is thermally transferred, from a thermal transfer sheet comprising a masking layer provided on a substrate film, onto the intermediate transfer recording medium in its transfer portion followed by the retransfer of the transfer portion with the masking layer transferred thereon onto the object, the masking layer functions to absorb or block heat at the time of retransfer, contributing to the formation of the receptive layer-nontransferred portion on the object in a simple and reliable manner.

The present invention is characterized in that the intermediate transfer recording medium has, on its substrate film, a portion not provided with a stripping layer and/or a receptive layer and the print has a receptive layer-nontransferred region. In the intermediate transfer recording medium comprising a receptive layer provided on a substrate film optionally through a stripping layer, the formation of a portion not provided with at least one of the stripping layer and the receptive layer followed by the transfer of the transfer portion including the portion not provided with at least one of the stripping layer and the receptive layer onto the object, the portion not provided with at least one of the stripping layer and the receptive layer forms a receptive layer-nontransferred region.

Further, the present invention is characterized in that the intermediate transfer recording medium comprises a masking layer in or on a layer in the transfer portion, and, upon the retransfer of the transfer portion in the intermediate transfer recording medium onto an object, a non-transferred portion is partially formed on the object. In the intermediate transfer recording medium comprising a transfer portion provided on a substrate film, when a masking layer is formed in or on a layer in the transfer portion followed by the retransfer of the transfer portion onto an object, the masking layer portion absorbs or blocks heat at the time of retransfer, whereby a receptive layer-non-retransferred portion can be formed on a part of the object.

Further, the intermediate transfer recording medium of the present invention is characterized by comprising: a substrate film; and, provided separably on the substrate film, a transfer portion comprising at least a receptive layer, wherein the intermediate transfer recording medium comprises a masking layer in an upper layer portion or a lower layer portion in the transfer portion, and, upon retransfer onto an object, the intermediate transfer recording medium can form a partially receptive layer-non-retransferred region in the object. Preferably, a detection mark is provided which is in synchronization with the masking layer-formed portion. In this case, when an image is thermally transferred onto the intermediate transfer recording medium in its predetermined position (a region except for the receptive layer-nonretransfer region), or when the receptive layer with the image thermally transferred thereon is retransferred onto an object, the receptive layer transfer portion and the receptive layer nontransfer portion can be accurately formed separately from each other with high positional accuracy.

The present invention is characterized in that a region, which is not retransferred onto the object, is provided on a part of at least one face unit in units picture plain partitioned by detection marks, and, in forming an image on both sides of the object, a receptive layer-non-retransferred region can be formed on a part of at least one side of the object. According to this construction, a receptive layer nonretransferred region and a receptive layer retransferred region with the image thermally transferred thereon can be simply formed, using a single intermediate transfer recording medium, on a part of one side or both sides of the object.

The method for image formation according to the present invention is characterized by comprising the steps of: providing any one of the above-described intermediate transfer recording media; and forming a receptive layer-non-retransferred region on a part of the object using the intermediate transfer recording medium. Specifically, in the method for image formation according to the present invention, in order to form a receptive layer-nonretransferred region on a part of the object, in an intermediate transfer recording medium comprising a substrate film and, separably provided on the substrate film, a transfer portion comprising at least a receptive layer, a masking layer, which, upon the retransfer onto the object, forms a nontransferred portion on a part of the object, is further provided on the transfer portion in its overlying layer portion or in its underlying layer portion. The receptive layer is retransferred from this intermediate transfer recording medium with the masking layer formed thereon onto the object to form a receptive layer-nonretransferred region on a part of the object. A portion with the receptive layer not transferred thereon can be simply and reliably formed onto the object using the intermediate transfer recording medium through the action of absorption or blocking of heat at the time of the transfer.

Further, the intermediate transfer recording medium according to the present invention characterized by comprising: a substrate film; and, provided on the substrate film in the following order, a stripping layer and a receptive layer, wherein the intermediate transfer recording medium has, on its substrate film, a portion not provided with the stripping layer and/or the receptive layer, and a receptive layer-non-retransferred region can be formed on a part of the object. Preferably, a detection mark, which is in synchronization with the portion not provided with the stripping layer and/or the receptive layer, is provided on the substrate film. In this case, when an image is thermally transferred onto the intermediate transfer recording medium in its predetermined position (a region except for the receptive layer-nonretransfer region) followed by the retransfer of the receptive layer with the image thermally transferred thereon onto an object, the receptive layer transfer portion and the receptive layer nontransfer portion can be accurately separated from each other.

Further, the intermediate transfer recording medium is characterized by comprising: a substrate film; and, provided on the substrate film in the following order, a stripping layer and a receptive layer, wherein the intermediate transfer recording medium has a region, which is not retransferred onto the object, is provided on a part of at least one side unit in units picture plain partitioned by detection marks, and, in forming an image on both sides of the object, the receptive layer-non-retransferred region can be formed on a part of at least one side of the object. According to this construction, a receptive layer nonretransferred region and a receptive layer retransferred region with the image thermally transferred thereon can be simply formed, using a single intermediate transfer recording medium, on a part of one side or both sides of the object.

The method for image formation according to the present invention is characterized by comprising the steps of: providing any one of the above-described intermediate transfer recording media; and forming a receptive layer-non-retransferred region on a part of the object. Specifically, in the method for image formation according to the present invention, an intermediate transfer recording medium is provided which comprises a substrate film and, provided on the substrate film in the following order, a stripping layer and a receptive layer, a portion not provided with the stripping layer and/or the receptive layer being provided on the substrate film so that, upon the transfer of the receptive layer onto an object, a receptive layer-nonretransferred region can be formed on a part of the object. The receptive layer is retransferred from this intermediate transfer recording medium onto the object to form a receptive layer-nonretransferred region on a part of the object. Since a portion not provided with the stripping layer and/or the receptive layer is previously formed on a substrate film in the intermediate transfer recording medium, the receptive layer-nontransferred portion can be simply and reliably formed on a part of the object.

BRIEF DESCRIPTION OF THE DRAWINGS

FIG. 5A is a schematic diagram showing still another embodiment of the print according to the present invention;

FIG. 5B is a schematic cross-sectional view of the print shown in FIG. 5A;

FIG. 6A is a schematic diagram showing still another embodiment of the intermediate transfer recording medium for use in the formation of the print according to the present invention;

FIG. 6B is a schematic cross-sectional view of the intermediate transfer recording medium shown in FIG. 6A;

DETAILED DESCRIPTION OF THE INVENTION

FIGS. 1 and 2 are schematic diagrams showing one embodiment of a print and an intermediate transfer recording medium for use in the formation of the print, corresponding to the present invention described in claim 1.

Figure 1A:
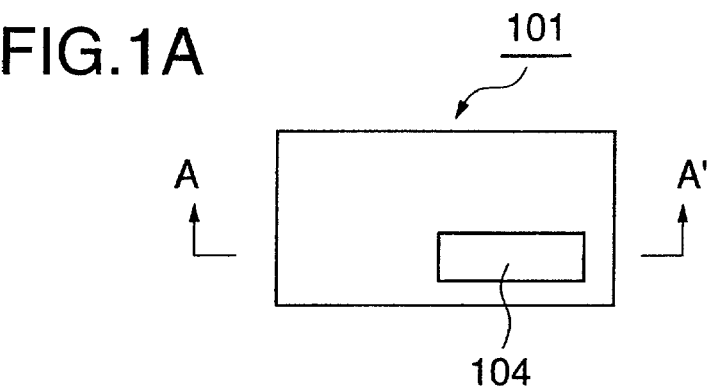
FIG. 1A is a schematic diagram showing one embodiment of the print according to the present invention.
Figure 1B:
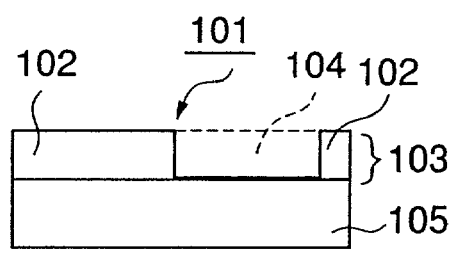
FIG. 1B is a schematic cross-sectional view of the print shown in FIG. 1A.
Figure 2A:
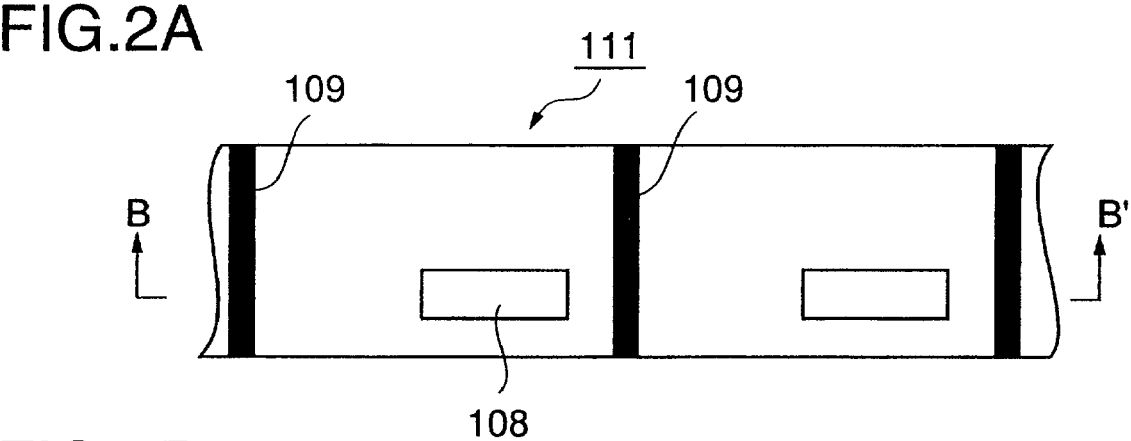
FIG. 2A is a schematic diagram showing one embodiment of an intermediate transfer recording medium for use in the formation of the print according to the present invention.
Figure 2B:
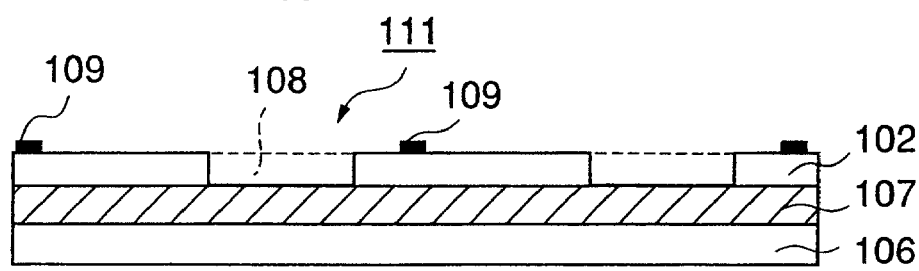
FIG. 2B is a schematic cross-sectional view of the intermediate transfer recording medium shown in FIG. 2A.

FIG. 2A is a schematic plan view of an intermediate transfer recording medium 111 for use in the formation of the print shown in FIG. 1A, and FIG. 2B is a schematic cross-sectional view taken on line B–B' of FIG. 2A. In the intermediate transfer recording medium 111, a receptive layer 102 is partially provided on a substrate film 106 through a stripping layer 107. In this case, the portion not provided with the receptive layer 102 is a void portion 108. A detection mark 109 for partition into each unit picture plain is provided on the receptive layer 102. The retransfer of the receptive layer 102 onto an object 105 using the intermediate transfer recording medium 111 provides a print 101 shown in FIGS. 1A and 1B. In this connection, it should be noted that an image is previously thermally transferred onto the receptive layer in the intermediate transfer recording medium using a separately provided thermal transfer sheet (not shown).

Regarding the print 101 shown in FIGS. 1 and 2, FIG. 1A is a schematic plan view of the print, and FIG. 1B is a schematic cross-sectional view taken on line A–A' of FIG. 1A. The print 101 is produced by retransferring the receptive layer 102 in the intermediate transfer recording medium 111 shown in FIGS. 2A and 2B onto the object 105. In one plain detected by taking advantage of the detection mark 109, the void portion 108 corresponds to the sign panel portion 104, and the receptive layer 102 in its portion other than the sign panel portion is transferred to provide a print 101. The print 101 is such that a transfer portion comprising the receptive layer 102 is partially formed on the object 105. For example, hand writing with a ballpoint pen or the like, numbering with a stamping ink, or seal with a vermilion inkpad can be made in the sign panel portion 104.

In the print shown in the drawing, only the receptive layer 102 is transferred as a transfer portion 103 onto the object 105. The present invention is not limited to this only. For example, the transfer portion may have a multilayer structure, for example, a two-layer structure of the stripping layer and the receptive layer.

FIGS. 3 and 4 are schematic diagrams showing one embodiment of a print and an intermediate transfer recording medium for use in the formation of the print, corresponding to the present invention described in claim 2.

Figure 3A:
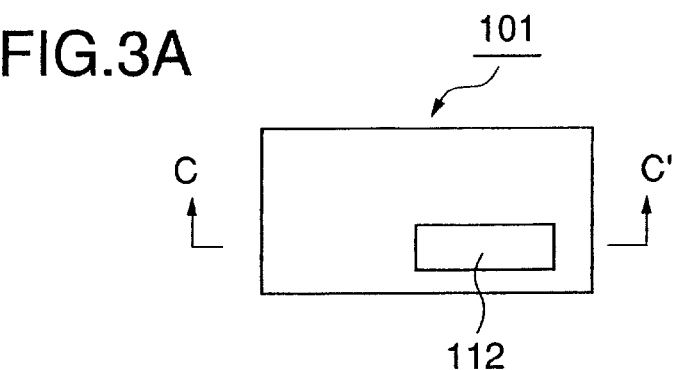
FIG. 3A is a schematic diagram showing another embodiment of the print according to the present invention.
Figure 4A:
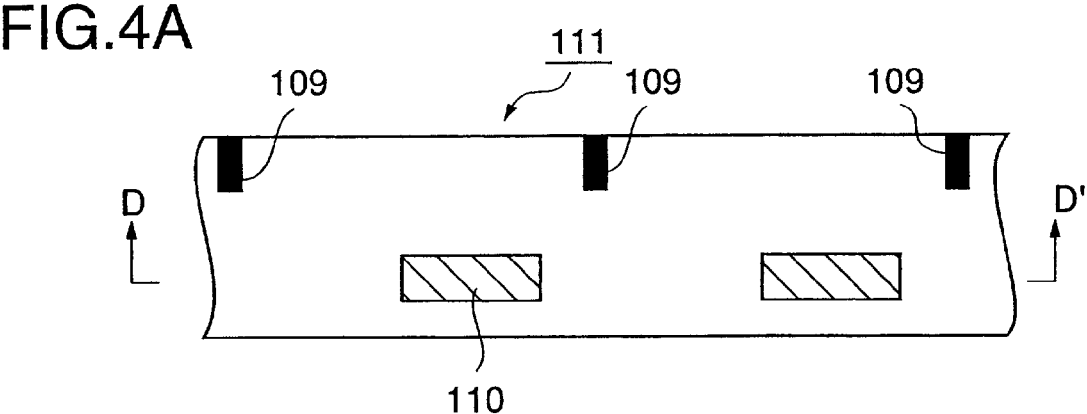
FIG. 4A is a schematic diagram showing another embodiment of the intermediate transfer recording medium for use in the formation of the print according to the present invention.
Figure 4B:
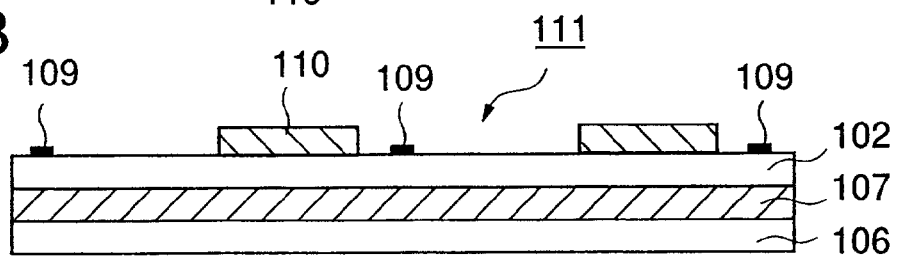
FIG. 4B is a schematic cross-sectional view of the intermediate transfer recording medium shown in FIG. 4A.

FIG. 4A is a schematic plan view of an intermediate transfer recording medium 111 for use in the formation of the print shown in FIG. 3A, and FIG. 4B is a schematic cross-sectional view taken on line D–D' of FIG. 4A. In the intermediate transfer recording medium 111, a receptive layer 102 is provided in a full density blotted form on a substrate film 106 through a stripping layer 107. A detection mark 109 for partition into each unit picture plain is provided on the receptive layer 102. A masking layer is previously transferred onto the receptive layer in the intermediate transfer recording medium from a separately provided thermal transfer sheet (not shown) comprising a thermally transferable masking layer provided on a substrate by heating means, such as a thermal head, for each unit picture plain. In this case, regarding the position of the masking layer 110 on the receptive layer 102 in the intermediate transfer recording medium 111, while synchronization with the detection mark 109, the distance between the detection mark 109 and the masking layer 110 is made constant, and the masking layer is repeatedly transferred for each unit picture plain on the receptive layer 102 in the intermediate transfer recording medium 111.

Figure 3B:
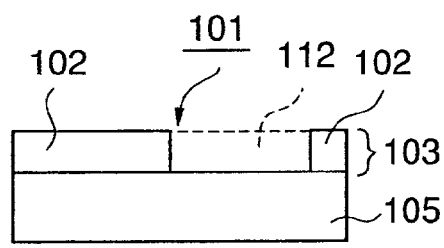
FIG. 3B is a schematic cross-sectional view of the print shown in FIG. 3A.

The retransfer of the receptive layer 102 onto an object 105 using the intermediate transfer recording medium 111 provides a print 101 shown in FIGS. 3A and 3B.

Regarding the print 101 shown in FIGS. 3 and 4, FIG. 3A is a schematic plan view of the print, and FIG. 3B is a schematic cross-sectional view taken on line C–C' of FIG. 3A. The print 101 is produced by retransferring the receptive layer 102 in the intermediate transfer recording medium 111 shown in FIGS. 4A and 4B onto the object 105. In one plain detected by taking advantage of the detection mark 109, the receptive layer 102 including the masking layer 110 is brought into contact with the transfer face of the object, and the receptive layer 102 is retransferred by heating means, such as a heat roll, onto the object 105. In this case, the masking layer 110 in the intermediate transfer recording medium 111 functions to absorb or block heat at the time of the retransfer of the receptive layer 102. By virtue of this, the masking layer-transferred portion in the intermediate transfer recording medium is not retransferred onto the object 105, and, thus, a portion 112, on which the receptive layer 102 has not been transferred, is formed on the object 105.

In the print 101 shown in the drawing, only the receptive layer 102 is transferred as a transfer portion 103 onto the object 105. The present invention is not limited to this only. For example, the transfer portion may have a multilayer structure, for example, a two-layer of the stripping layer and the receptive layer.

FIGS. 5 and 6 are schematic diagrams showing one embodiment of a print and an intermediate transfer recording medium for use in the formation of the print, corresponding to the present invention described in claim 3.

FIG. 6A is a schematic plan view of an intermediate transfer recording medium 111 for use in the formation of the print shown in FIG. 5A, and FIG. 6B is a schematic cross-sectional view taken on line F–F' of FIG. 6A. In the intermediate transfer recording medium 111, a detection mark 109 for partition into each one unit picture plain is formed on a substrate film 106 Next, a stripping layer 107 and a receptive layer 102 are formed in that order on a part of the substrate film 106. In this intermediate transfer recording medium 111, a portion 114 not provided with at least one of the stripping layer 107 and the receptive layer 102 (in the embodiment shown in the drawing, a portion provided with neither the stripping layer 107 nor the receptive layer 102) is formed, while, in the portion except for the portion 114, the stripping layer 107 and the receptive layer 102 are stacked on top of each other. In forming the stripping layer 107 and the receptive layer 102 on a part of the substrate film 106 in the intermediate transfer recording medium 111, synchronization with the detection mark 109, that is, reading of the detection mark 109 with a detector to regulate means for coating the stripping layer and the receptive layer, can realize the formation of the stripping layer 107 and the receptive layer 102 in such a state that the distance between the detection mark 109 and the stripping layer 107 and the distance between the detection mark 109 and the receptive layer 102 are constant. The formation of the stripping layer 107 and the receptive layer 102 in the intermediate transfer recording medium 111 is repeatedly carried out on the substrate film 106 for each one unit of the detection mark 109, that is, for each one unit picture plain.

The retransfer of the receptive layer 102 onto an object 105 using the intermediate transfer recording medium 111 provides a print 101 shown in FIGS. 5A and 5B.

Regarding the print 101 shown in FIGS. 5 and 6, FIG. 5A is a schematic plan view of the print, and FIG. 5B is a schematic cross-sectional view taken on line E–E' of FIG. 5A. The print 101 is produced by retransferring the receptive layer 102 in the intermediate transfer recording medium 111 shown in FIGS. 6A and 6B onto the object 105. In one plain detected by taking advantage of the detection mark 109, the receptive layer 102 is brought into contact with the transfer face of the object, and the receptive layer 102 is retransferred by heating means, such as a heat roll, onto the object 105. Preferably, at the time of the retransfer, the detection mark 109 in the intermediate transfer recording medium 111 is detected for accurate registration of the receptive layer transfer position of the object 105. This permits also the position of the receptive layer non-transfer region 113 to be accurately fixed on the object.

Upon heating at the time of the retransfer, the receptive layer 102 is stripped and separated from the stripping layer 107 in the intermediate transfer recording medium 111 and is transferred onto the object 105. In this case, the portion 114 not provided with at least one of the stripping layer 107 and the receptive layer 102 forms a receptive layer-non-transferred region 113 on the object side. The transfer portion 103 on the object 105 shown in FIG. 5B is composed of the receptive layer 102 alone. The present invention is not limited to this only, and, for example, the transfer portion may have a multilayer structure, for example, a two-layer structure of the stripping layer and the receptive layer. In this case, the position of the detection mark should be carefully determined so that the detection mark does not go into the transfer portion.

FIGS. 7 and 8 are schematic diagrams showing one embodiment of a print and an intermediate transfer recording medium for use in the formation of the print, corresponding to the present invention described in claim 4.

Figure 7A:
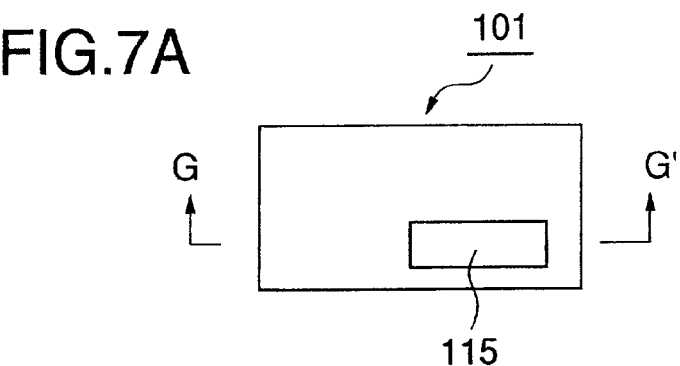
FIG. 7A is a schematic diagram showing a further embodiment of the print according to the present invention.
Figure 8A:
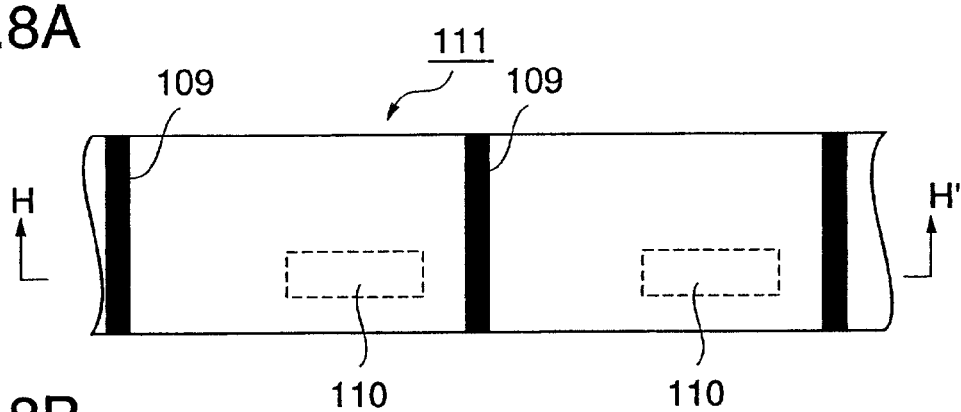
FIG. 8A is a schematic diagram showing a further embodiment of the intermediate transfer recording medium for use in the formation of the print according to the present invention.
Figure 8B:
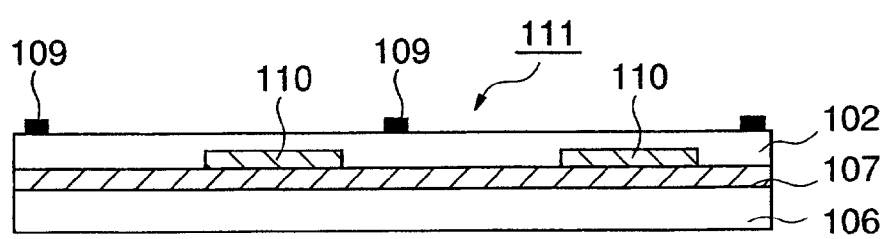
FIG. 8B is a schematic cross-sectional view of the intermediate transfer recording medium shown in FIG. 8A.

FIG. 8A is a schematic plan view of an intermediate transfer recording medium 111 for use in the formation of the print shown in FIG. 7A, and FIG. 8B is a schematic cross-sectional view taken on line H–H' of FIG. 8A. In the intermediate transfer recording medium 111, a release layer 116 is formed in a full density blotted form on one side of a substrate film 106, and a masking layer 110 is formed in each one unit picture plain on a part of the release layer 116 Further, a receptive layer 102 is formed in a full density blotted form on the release layer 116 so as to cover the masking layer 110. A detection mark 109 for partition into each one unit picture plain is then formed on the receptive layer 102. In this case, while synchronization of the detection mark 109 with the masking layer 110 to render the distance between the detection mark 109 and the masking layer 110 constant, the detection mark 109 and the masking layer 110 are repeatedly formed for each unit picture plain on the intermediate transfer recording medium 111.

Figure 7B:
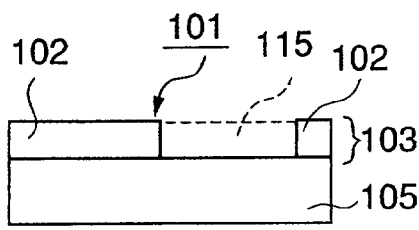
FIG. 7B is a schematic cross-sectional view of the print shown in FIG. 7A.

The retransfer of the receptive layer 102 onto an object 105 using the intermediate transfer recording medium 111 provides a print 101 shown in FIGS. 7A and 7B.

Regarding the print 101 shown in FIGS. 7 and 8, FIG. 7A is a schematic plan view of the print, and FIG. 7B is a schematic cross-sectional view taken on line G–G' of FIG. 7A. The print 101 is produced by retransferring the receptive layer 102 in the intermediate transfer recording medium 111 shown in FIGS. 8A and 8B onto the object 105. In one plain detected by taking advantage of the detection mark 109, the receptive layer 102 including the masking layer 110 is brought into contact with the transfer face of the object, and the receptive layer 102 is retransferred by heating means, such as a heat roll, onto the object 105. In this case, the masking layer 110 in the intermediate transfer recording medium 111 functions to absorb or block heat at the time of the retransfer of the receptive layer 102. By virtue of this, the masking layer-transferred portion in the intermediate transfer recording medium 111 is not retransferred onto the object 105, and, thus, a portion 115, on which the receptive layer 102 has not been retransferred, is formed on the object 105.

In the intermediate transfer recording medium 111 shown in the drawing, a transfer portion composed of the release layer 116 and the receptive layer 102 is provided on the substrate film 106, and the masking layer 110 is formed between the release layer 116 and the receptive layer 102 in such a manner that the masking layer 110 is provided within the layer of the transfer portion. The present invention, however, is not limited to this only, and the masking layer may be provided on the layer of the transfer portion (on the receptive layer) in the intermediate transfer recording medium or between the substrate film and the release layer.

In the print 101 shown in FIGS. 7 and 8, only the receptive layer 102 is transferred as the transfer portion 103 onto the object 105. The present invention, however, is not limited to this only. For example, a transfer portion having a multilayer structure, for example, a two-layer structure of the stripping layer and the receptive layer may be retransferred onto the object.

Figure 9:
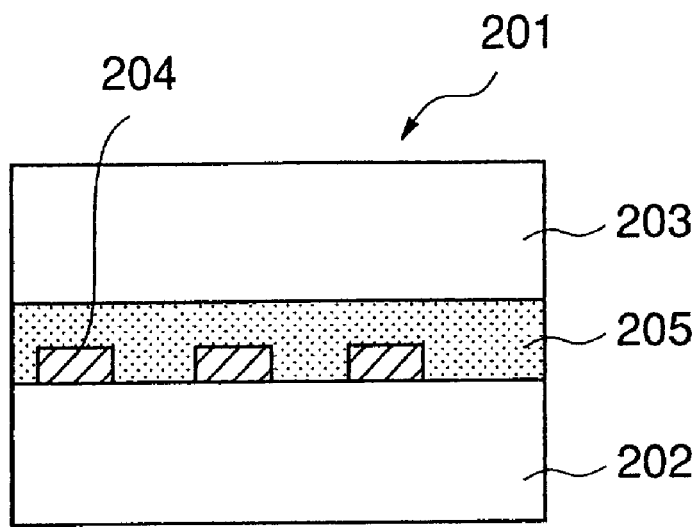
FIG. 9 is a schematic cross-sectional view showing a still further embodiment of the intermediate transfer recording medium according to the present invention.

FIG. 9 is a schematic cross-sectional view showing one embodiment of an intermediate transfer recording medium 201 according to the present invention. In this intermediate transfer recording medium 201, a masking layer 204 is partially provided on one side of a substrate film 202. A release layer 205 is provided on the whole area of the masking layer 204 and the substrate film 202, and a receptive layer 203 is provided on the release layer 205. Specifically, in the embodiment of the intermediate transfer recording medium 201 shown in FIG. 9, a masking layer 204 for forming a partially non-transferred portion on the object upon retransfer onto the object is formed in a lower layer portion in the transfer portion composed of the release layer 205 and the receptive layer 203. That is, at the time of retransfer onto the object, the masking layer 204 is brought into intimate contact with the substrate film 202 and is not transferred onto the object.

Figure 10:
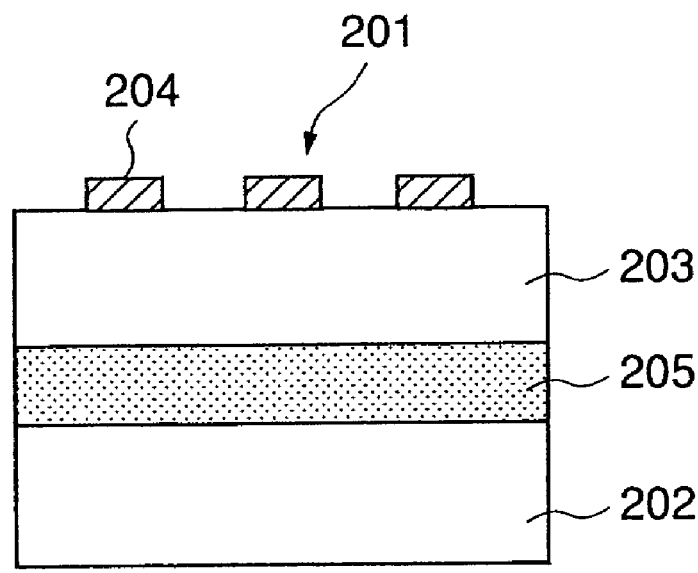
FIG. 10 is a schematic cross-sectional view showing another embodiment of the intermediate transfer recording medium according to the present invention.

FIG. 10 is a schematic cross-sectional view showing another embodiment of the intermediate transfer recording medium 201 according to the present invention. In this intermediate transfer recording medium 201, a release layer 205 is provided on the whole area of one side of a substrate film 202, a receptive layer 203 is provided on the release layer 205, and a masking layer 204 is provided on a part of the receptive layer 203. Specifically, in the embodiment of the intermediate transfer recording medium 201 shown in FIG. 10, a masking layer 204 for forming a non-transferred portion on a part of an object upon the retransfer onto the object is formed in the upper layer portion in the transfer portion composed of the release layer 205 and the receptive layer 203. In this case, since the masking layer 204 is not adhered to the object, at the time of the retransfer, the masking layer 204 portion is not transferred onto the object.

Figure 11A:
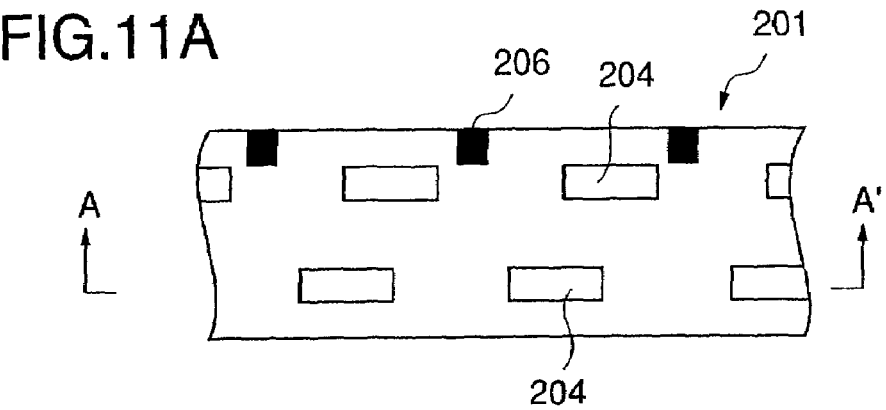
FIG. 11A is a schematic diagram showing still another embodiment of the intermediate transfer recording medium according to the present invention.
Figure 11B:
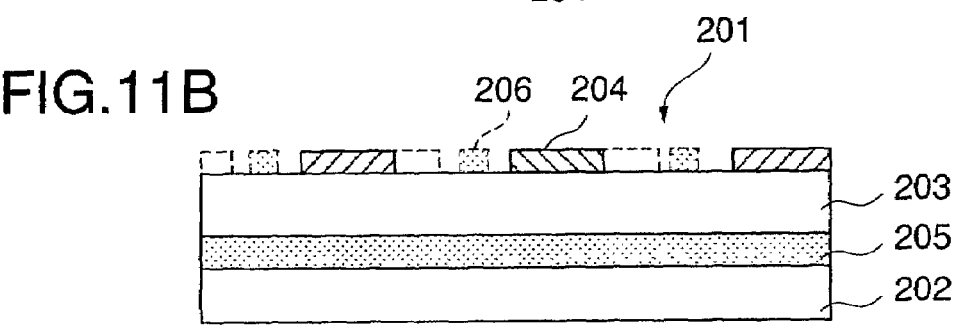
FIG. 11B is a schematic cross-sectional view of the intermediate transfer recording medium shown in FIG. 11A.

Further, FIG. 11 is a schematic diagram showing still another embodiment of the intermediate transfer recording medium 201 according to the present invention, wherein FIG. 11A is a schematic plan view of an intermediate transfer recording medium and FIG. 11B is a schematic cross-sectional view taken on line A–A' of FIG. 11A.

In the embodiment of the intermediate transfer recording medium 201 shown in FIG. 11, the masking layer 204 as a receptive layer-non-retransfer region is a void portion in the receptive layer transfer portion, and, in this embodiment, two void portions per one plain constitute the masking layer 204. Regarding a detection mark 206 in synchronization with the portion of the masking layer 204, one detection mark is generally formed per one plain. The receptive layer 203 is provided on the whole area of one side of the substrate film 202, and the detection mark 206 shown in the drawing is formed on the receptive layer 203, that is, on the uppermost layer in the intermediate transfer recording medium 201.

Figure 12A:
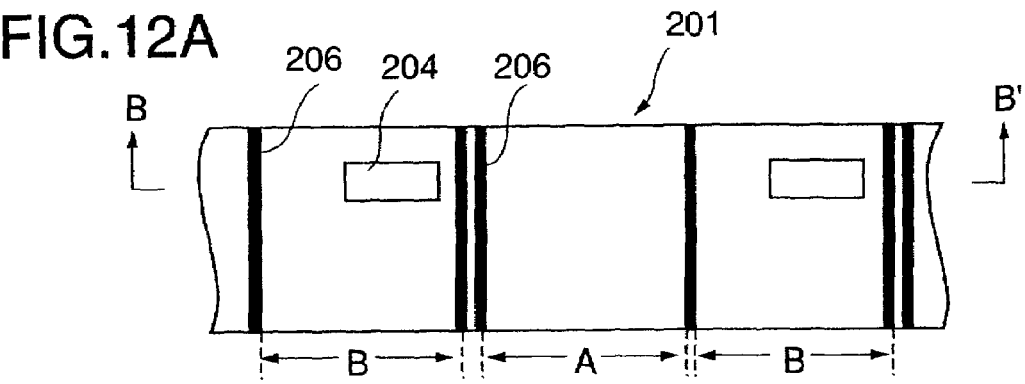
FIG. 12A is a schematic diagram showing a further embodiment of the intermediate transfer recording medium according to the present invention.
Figure 12B:
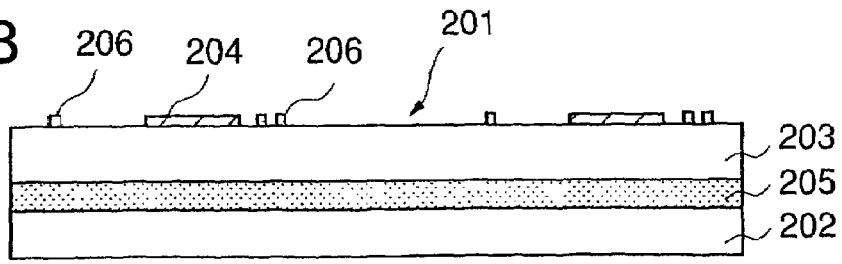
FIG. 12B is a schematic cross-sectional view of the intermediate transfer recording medium shown in FIG. 12A.

FIG. 12 is a schematic diagram showing a further embodiment of the intermediate transfer recording medium 201 according to the present invention, wherein FIG. 12A is a schematic plan view of an intermediate transfer recording medium, and FIG. 12B is a schematic cross-sectional view taken on line B–B' of FIG. 12A.

The intermediate transfer recording medium 201 shown in FIG. 12 is used for the formation of an image on both sides of an object by the retransfer of the receptive layer. In the intermediate transfer recording medium 201, a release layer 205 and a receptive layer 203 are provided on one side of a substrate film 202, and, for each unit picture plain partitioned by the detection mark 206, a transfer layer A for the upper surface (top surface) of the object and a transfer layer B for the lower surface (backside) of the object are alternately and repeatedly formed in the order of ABABABA... In the transfer layer A for the upper surface of the object, no layer is formed on the receptive layer 203. On the other hand, in the transfer layer B for the lower surface of the object, a masking layer 204 is partially formed, on the receptive layer 203, as a receptive layer non-retransfer region not to be retransferred onto an object.

The masking layer 204 as the receptive layer non-retransfer region is in a rectangular void form in the receptive layer transfer portion and is repeatedly formed between transfer layers A for the upper surface of the object while leaving a space by one plain. The detection mark 206 is provided on the receptive layer 203 in the intermediate transfer recording medium 201. The use of the intermediate transfer recording medium in this embodiment can provide a receptive layer-non-retransferred region on a part of the backside of the object and can simply form a thermally transferred image on both sides of the object. The detection mark 206 can detect the position of each transfer layer for the upper surface and the lower surface of the object and can realize the formation of the thermally transferred image on the object with high positional accuracy.

Thus, as shown in the drawing, the masking layer is formed in the upper layer portion or lower layer portion of the transfer portion comprising at least a receptive layer.

Figure 13A:
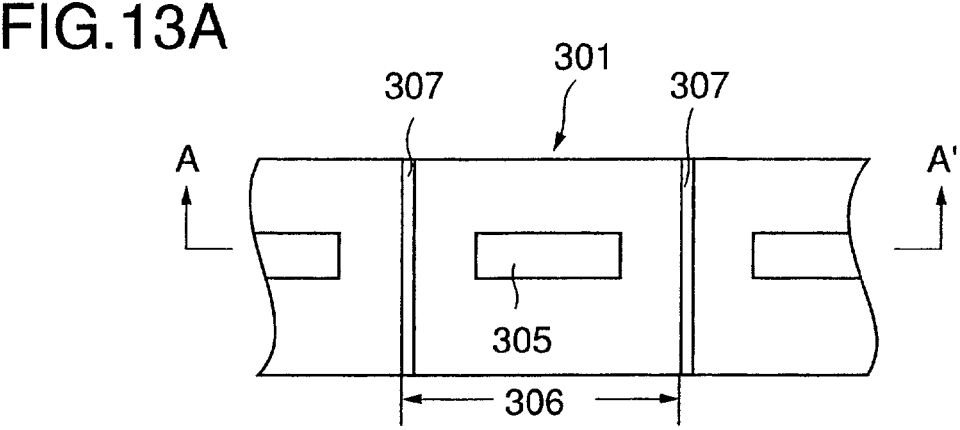
FIG. 13A is a schematic diagram showing a still further embodiment of the intermediate transfer recording medium according to the present invention.
Figure 13B:
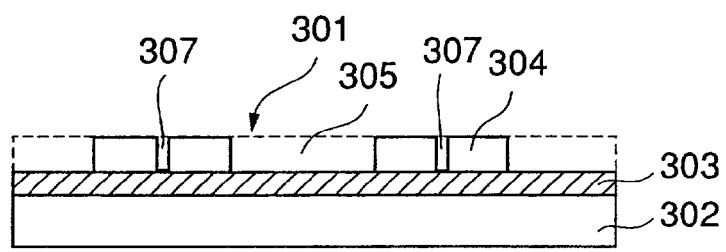
FIG. 13B is a schematic cross-sectional view of the intermediate transfer recording medium shown in FIG. 13A.

FIG. 13 is a schematic diagram showing one embodiment of the intermediate transfer recording medium according to the present invention, wherein FIG. 13A is a schematic plan view of the intermediate transfer recording medium and FIG. 13B is a schematic cross-sectional view taken on line A–A' of FIG. 13A.

In the intermediate transfer recording medium 301 shown in FIG. 13B, a stripping layer 303 is provided on the whole area of a substrate film 302, and a receptive layer 304 is provided on a part of the stripping layer 303. That is, a receptive layer non-retransfer region 305 is provided. The receptive layer non-retransfer region 305 shown in the drawing is a void portion in the receptive layer transfer portion, and, further, a boundary portion 307 between image units 306 is also the receptive layer non-retransfer region 305.

The receptive layer non-retransfer region 305 shown in FIG. 13 corresponds to a portion not provided with only the receptive layer 304 on the substrate film. The present invention is not limited to this only. For example, a portion not provided with only the stripping layer or a portion provided with neither the stripping layer nor the receptive layer may be provided on the substrate film. That is, the portion not provided with the stripping layer and/or receptive layer on the substrate film is the receptive layer non-retransfer region.

Figure 14A:
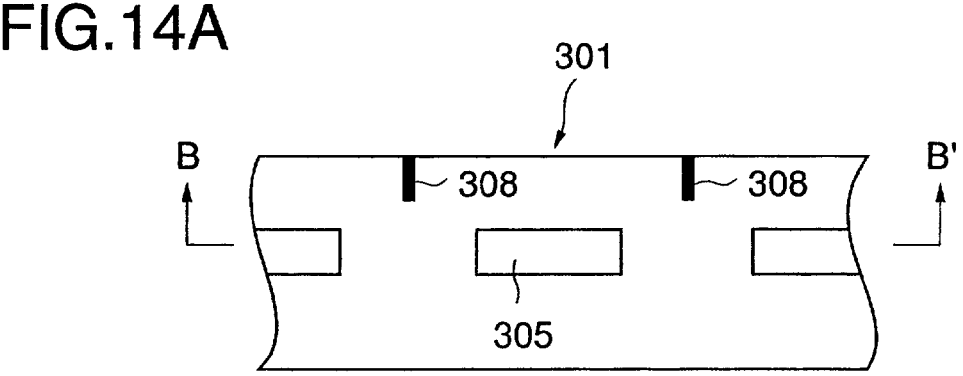
FIG. 14A is a schematic diagram showing another embodiment of the intermediate transfer recording medium according to the present invention.
Figure 14B:
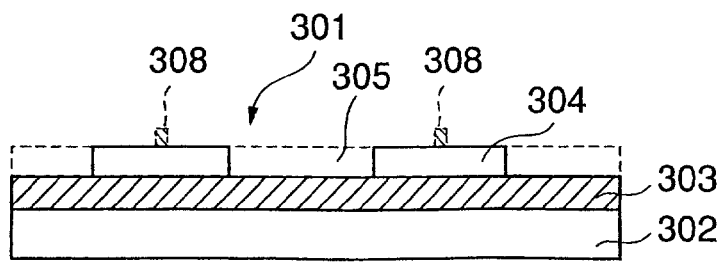
FIG. 14B is a schematic cross-sectional view of the intermediate transfer recording medium shown in FIG. 14A.

FIG. 14 is a schematic diagram showing another embodiment of the intermediate transfer recording medium according to the present invention, wherein FIG. 14A is a schematic plan view of the intermediate transfer recording medium, and FIG. 14B is a schematic cross-sectional view taken on line B–B' of FIG. 14A.

In the embodiment of the intermediate transfer recording medium 301 shown in FIG. 14, a receptive layer non-retransfer region 305 is a void portion in the receptive layer transfer portion, and a detection mark 308 is provided in synchronization with the receptive layer non-retransfer region 305. Further, in the intermediate transfer recording medium 301, a stripping layer 303 is provided on the whole area of the substrate film 302, and a receptive layer 304 is partially formed on the stripping layer 303, whereby the receptive layer non-retransfer region 305 is formed. The receptive layer non-retransfer region 305 shown in the drawing is a void portion in the receptive layer transfer portion. The detection mark 308 in synchronization with the receptive layer non-retransfer region 305 is provided on the receptive layer 304 on the substrate film 302, that is, on the uppermost layer of the intermediate transfer recording medium 301.

Thus, the formation of the detection mark in synchronization with the receptive layer non-retransfer region in the intermediate transfer recording medium permits a receptive layer-transferred region and a receptive layer-non-retransferred region on the object to be provided and to form a thermally transferred image with high positional accuracy.

Figure 15A:
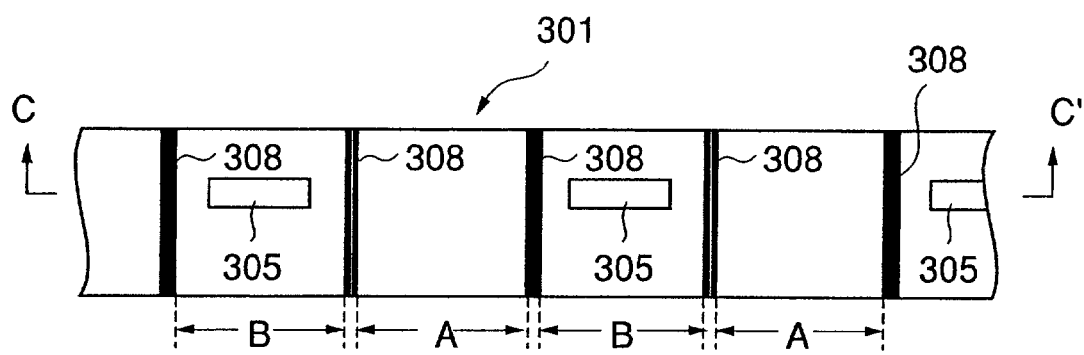
FIG. 15A is a schematic diagram showing still another embodiment of the intermediate transfer recording medium according to the present invention.
Figure 15B:
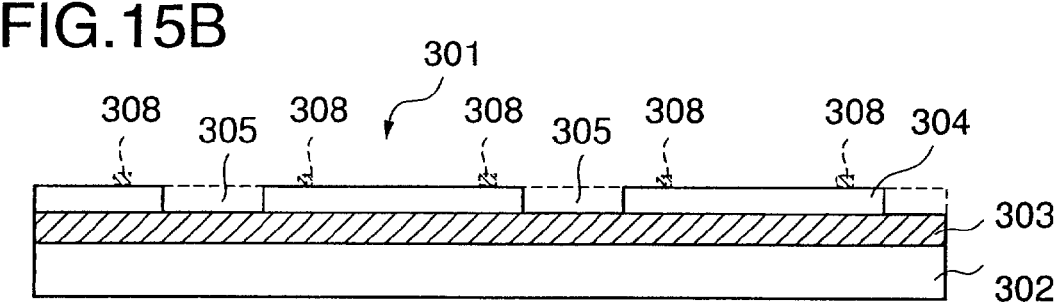
FIG. 15B is a schematic cross-sectional view of the intermediate transfer recording medium shown in FIG. 15A.

FIG. 15 is a schematic diagram showing a still another embodiment of the intermediate transfer recording medium according to the present invention, wherein FIG. 15A is a schematic plan view of the intermediate transfer recording medium, and FIG. 15B is a schematic cross-sectional view taken on line C–C' of FIG. 15A.

The intermediate transfer recording medium 301 shown in FIG. 15 is used for the formation of an image on both sides of an object by the retransfer of the receptive layer. In the intermediate transfer recording medium 301, a stripping layer 303 is provided on the whole area of one side of a substrate film 302, and, for each unit picture plain partitioned by the detection mark 308, a transfer layer A for the upper surface of the object and a transfer layer B for the lower surface of the object are alternately and repeatedly formed in the order of ABABABA.... For the whole area of the transfer layer A for the upper surface of the object, the receptive layer 304 is provided on the stripping layer 303. For the transfer layer B for the lower surface of the object, a receptive layer non-retransfer region 305 not to be retransferred onto the object is partially formed.

The receptive layer non-retransfer region 305 is in a quadrateral void form in the receptive layer transfer portion and is repeatedly formed between transfer layers A for the upper surface of the object while leaving a space by one plain. The detection mark 308 is provided on the receptive layer 304 in the intermediate transfer recording medium 301. The use of the intermediate transfer recording medium in this embodiment can provide a receptive layer-non-retransferred region on a part of the backside of the object and can simply form a thermally transferred image on both sides of the object. The detection mark 308 can detect the position of each transfer layer for the upper surface and the lower surface of the object and can realize the formation of the thermally transferred image on the object with high positional accuracy.

Individual elements constituting the intermediate transfer recording medium will be described.

Substrate Film:

The substrate film for the intermediate transfer recording medium is not particularly limited, and the same substrate film as used in the conventional intermediate transfer recording medium as such may be used. Specific preferred examples of the substrate film include: thin paper, such as glassine paper, capacitor paper, or paraffin-waxed paper; and stretched or unstretched films of plastics, for example, highly heat resistant polyesters, such as polyethylene terephthalate, polyethylene naphthalate, polybutylene terephthalate, polyphenylene sulfide, polyether ketone, or polyether sulfone, and other plastics, such as polypropylene, polycarbonate, cellulose acetate, polyethylene derivative, polyvinyl chloride, polyvinylidene chloride, polystyrene, polyamide, polyimide, polymethylpentene, or ionomer.

Composite films comprising a laminate of two or more materials selected from the above materials may also be used. The thickness of the substrate film may be properly selected according to the material so as to provide proper strength, heat resistance and other properties. In general, however, the thickness of the substrate film is preferably about 1 to 100 µm.

In the intermediate transfer recording medium according to the present invention, if necessary, from the viewpoint of preventing adverse effect of sticking, cockles or the like caused by heat of a thermal head, a heat roll or the like as means for the retransfer of an image formed portion onto an object, a backside layer may be provided on the backside of the substrate film, that is, on the surface of the substrate film remote from the receptive layer.

Receptive Layer:

The receptive layer is a major portion in the transfer portion constituting the intermediate transfer recording medium. An image is formed by thermal transfer on the receptive layer from a thermal transfer sheet having a colorant layer. The intermediate transfer recording medium in its transfer portion with the image formed thereon is transferred onto an object, and, thus, a print is formed.

For this reason, a conventional resin material, which is receptive to a thermally transferable colorant such as a sublimable dye or a hot-melt ink, may be used as the material for the receptive layer. Examples of materials usable herein include: polyolefin resins such as polypropylene; halogenated resins such as polyvinyl chloride or polyvinylidene chloride; vinyl resins such as polyvinyl acetate, vinyl chloride-vinyl acetate copolymer, ethylene-vinyl acetate copolymer, or polyacrylic ester; polyester resins such as polyethylene terephthalate or polybutylene terephthalate; polystyrene resin; polyamide resin; resins of copolymers of olefins, such as ethylene or propylene, with other vinyl polymers; ionomers; cellulosic resins such as cellulose diastase; and polycarbonates. Vinyl chloride resins, acryl-styrene resins, or polyester resins are particularly preferred.

When the receptive layer is transferred through an adhesive layer onto an object, the receptive layer per se is not always required to be adhesive. On the other hand, when the receptive layer is transferred onto the object without through the adhesive layer, the formation of the receptive layer using a resin material having adhesive properties, such as vinyl chloride-vinyl acetate copolymer, is preferred.

The receptive layer may be formed by dissolving or dispersing a single or plurality of materials, selected from the above materials, optionally mixed with various additives or the like, in a suitable solvent such as water or an organic solvent to prepare a coating liquid for a receptive layer, coating the coating liquid by means such as gravure printing, plain printing, or reverse coating using a gravure plate, and drying the coating. The thickness (coverage) of the receptive layer is about 1 to 10 g/m$^2$ on a dry basis.

Stripping Layer:

In the intermediate transfer recording medium used in the present invention, a receptive layer may be formed on a substrate film through a stripping layer. The provision of the stripping layer can realize the retransfer of a transfer layer composed mainly of a receptive layer from the intermediate transfer recording medium onto an object in a reliable and simple manner.

The stripping layer may be formed of, for example, waxes, such as microcrystalline wax, carnauba wax, paraffin wax, Fischer-Tropsh wax, various types of low-molecular weight polyethylene, Japan wax, beeswax, spermaceti, insect wax, wool wax, shellac wax, candelilla wax, petrolatum, partially modified wax, fatty esters, and fatty amides, and thermoplastic resins, such as silicone wax, silicone resin, fluororesin, acrylic resin, polyester resin, polyurethane resin, cellulose resin, vinyl chloride-vinyl acetate copolymer, and nitrocellulose.

Further, the stripping layer may be formed of a binder resin and a releasable material. Binder resins usable herein include thermoplastic resins, for example, acrylic resins, such as polymethyl methacrylate, polyethyl methacrylate, polybutyl acrylate, vinyl resins, such as polyvinyl acetate, vinyl chloride-vinyl acetate copolymer, polyvinyl alcohol, and polyvinylbutyral, and cellulose derivatives, such as ethylcellulose, nitrocellulose, and cellulose acetate, and thermosetting resins, for example, unsaturated polyester resins, polyester resins, polyurethane resins, and aminoalkyl resins. Releasable materials include waxes, silicone wax, silicone resins, melamine resins, fluororesins, fine powders of talc or silica, and lubricants such as surfactants or metal soaps.

The stripping layer may be formed by dissolving or dispersing the above-described necessary materials in a suitable solvent to prepare a coating liquid for a stripping layer, coating the coating liquid onto a substrate film by gravure printing, plain printing, reverse coating using a gravure plate or other means, and drying the coating. The coverage is generally 0.1 to 10 g/m$^2$ on a dry basis.

In the intermediate transfer recording medium used in the present invention, if necessary, from the viewpoints of preventing fusing to heating means such as a thermal head or a heat roll and improving slidability, a backside layer may be provided on the surface of the substrate film remote from the receptive layer.

Masking Layer:

The masking layer used in the present invention is provided in the upper layer portion or the lower layer portion in the transfer portion of the intermediate transfer recording medium. When the transfer portion is transferred onto the object, in the transfer portion in its portion provided with the masking layer, the masking layer absorbs or blocks heat at the time of the transfer, whereby the transfer portion in its portion provided with the masking layer is not transferred onto the object.

Binder resins usable in the masking layer include acrylic resin, acrylcellulose resin, cellulosic resin, polystyrene resin, polyurethane resin, polyester resin, polycarbonate resin, polyamide resin, polysulfone resin, polyvinyl chloride resin, polyvinyl acetate resin, vinyl chloride-vinyl acetate copolymer resin, polyvinylacetal resin, polyvinylbutyral resin, polyvinyl alcohol resin, epoxy resin, ethylene-vinyl acetate copolymer resin, polyethylene resin, and polypropylene resin. Regarding resins having active hydrogen among these resins, isocyanate crosslinking products thereof may also be used as the binder.

The masking layer may contain fillers. Examples of fillers include: inorganic filler, such as silica, alumina, clay, talc, calcium carbonate, and barium sulfate; white pigments such as titanium oxide and zinc oxide; resin particles (plastic pigments) of acrylic resins, epoxy resins, polyurethane resins, phenolic resins, melamine resins, benzoguanamine resins, fluororesins, silicone resins and the like; and various conventional wax particles of polyethylene wax, paraffin wax, carnauba wax, microcrystalline wax, Japan wax, beeswax, spermaceti, insect wax, wool wax, candelilla wax, partially modified wax, fatty amides and the like. When a bubble-forming or foaming agent is incorporated into the masking layer, or when a filler is incorporated into the masking layer, these agents may be added in an amount of about 0.01 to 200% by weight based on the binder resin for the masking layer.

Further, a porous masking layer having the following islands-sea structure may be used. The porous structure may be generally formed by a wet coagulation process. In this process, two or more pore-forming resin components, which are greatly different from each other in solubility parameter, are dissolved in a solvent. The solution is coated onto a substrate film, and the coated substrate film is then passed into a solvent which can be mixed with the solvent but does not dissolve the resin component to perform solvent replacement. As a result, under the replaced solvent, since the pore-forming resin components are greatly different from each other in solubility parameter, the two or more resins form an islands-sea structure. When the coated substrate film is then passed into a hot bath, the island portion in the islands-sea structure is further heat shrinked, leading to further progress of the formation of pores. In this case, the island portion is constituted by organic fine particles. Thereafter, desorption and drying are carried out to form a porous masking layer. In the case of this porous masking layer, the size and density of the island portion and the thickness of the non-transfer layer should be regulated to attain adiabatic effect.

The masking layer is formed at a coverage of about 0.05 to 5.0 g/m$^2$ on a dry basis by conventional coating means such as gravure coating, gravure reverse coating, or roll coating.

In the intermediate transfer recording medium according to the present invention, if necessary, from the viewpoints of preventing fusing to heating means such as a thermal head or a heat roll and improving slidability, a backside layer may be provided on the surface of the substrate film remote from the receptive layer.

Detection Mark:

In order to detect the portion not provided with the receptive layer or the portion provided with the masking layer, or in order to specify the position of the transfer portion, on the substrate film, to be transferred onto the object, a detection mark in synchronization with these positions may be formed in the intermediate transfer recording medium.

The shape, color and the like of the detection mark are not limited so far as they are detectable with a detector. Shapes include, for example, a quadrangle, a circle, a bar code, and a line from end to end in the widthwise direction of the intermediate transfer recording medium. The color of the detection mark may be any one so far as it is detectable with a detector. For example, in the case of a light transmission detector, silver, black or other colors having high covering power may be mentioned. On the other hand, in the case of a light reflection detector, for example, a metalescent color tone with high light reflection may be mentioned.

Further, a mark using a hologram or a diffraction grating can be used as the detection mark. This hologram mark may be formed by a conventional hologram pattern formation method, for example, by forming fine convexes and concaves by embossing using an original plate having a concave-convex pattern of interference fringes of hologram. The so-called "hologram sensor" can be utilized as a sensor for this hologram mark. In this case, light emitted from a light-emitting device is irregularly reflected from the hologram mark to emit diffracted light. The diffracted light can be detected with a photodetector to detect the position of the hologram mark.

The position of the detection mark is not limited to that shown in the drawing. For example, when the film substrate is transparent, the detection mark may be provided on the surface of the film substrate remote from the receptive layer. Alternatively, the detection mark may be provided within the transfer layer between the film substrate and the release layer in the intermediate transfer recording medium.

The detection mark used in the intermediate transfer recording medium is generally formed in synchronization with the portion not provided with the receptive layer or the portion partially provided with the masking layer. In this case, the number of detection marks is generally one per plain.

Release Layer:

In the intermediate transfer recording medium according to the present invention, a release layer may be provided from the viewpoint of improving the separability of the receptive layer from the substrate film at the time of retransfer onto an object.

The release layer is provided when the separation of the receptive layer from the substrate film at the time of heat transfer onto the object is unsatisfactory due to a combination of the material of the substrate film with the material of the receptive layer. The release layer may be formed of any material without particular limitation. A release agent such as waxes, silicone wax, or silicone resin may be used. Alternatively, a resin may be properly selected from, for example, hydrophilic resins and various curable resins described, for example, in Japanese Patent Laid-Open No. 142988/1992, according to properties of the substrate film and the non-transfer layer. The release layer may be formed by dissolving or dispersing the above-described release agent, optionally mixed with necessary additives, in a suitable solvent to prepare an ink and coating the ink onto a substrate film by conventional means and drying the coating. The coverage of the release layer is preferably about 0.1 to 5 g/m$^2$ on a dry basis.

Object:

Next, the object will be described. The intermediate transfer recording medium in its transfer portion with a thermally transferred image formed thereon is transferred onto the object. The object used in the present invention is not particularly limited, and examples thereof include natural pulp paper, coated paper, tracing paper, plastic films which are not deformed upon exposure to heat at the time of transfer, glasses, metals, ceramics, wood, and cloths.

However, when a masking layer is used or the transfer portion partially lacks, that is, when the non-transfer portion in the intermediate transfer medium is, for example, for the place for writing of address, name or the like, or the place for seal of a person, who has written the address, name or the like, or an issuer, in the object, natural pulp paper, which has good suitability for writing or seal, is preferably used as the object.

The natural pulp paper is not particularly limited, and examples thereof include wood-free paper, art paper, light-weight coated paper, slightly coated paper, coated paper, cast coated paper, synthetic resin- or emulsion-impregnated paper, synthetic rubber latex-impregnated paper, paper with synthetic resin being internally added thereto, and paper for thermal transfer.

Regarding the form and applications of the object, there is no limitation on the type, and examples thereof include: gold notes, such as stock certificates, securities, deeds, passbooks, railway tickets, streetcar tickets, stamps, postage stamps, appreciation tickets, admission tickets, and other tickets; cards, such as bank cards, credit cards, prepaid cards, membership cards, greeting cards, postcards, business cards, driver's licenses, IC cards, and optical cards; cases, such as cartons and containers; bags; forms control; envelops; tags; OHP sheets; slide films; bookmarks; calendars; posters; pamphlets; menus; passports; POP goods; coasters; displays; name plates; keyboards; cosmetics; accessories such as wristwatches and lighters; stationeries such as report pads; building materials; panels; emblems; keys; cloths; clothes; foot wears; equipment or devices such as radios, televisions, electronic calculators, and OA equipment; various sample or pattern books; albums; and outputs of computer graphics and outputs of medical images.

The print according to the present invention is produced by retransferring the transfer portion, with an image formed thereon in the intermediate transfer recording medium, onto the above object. At the time of the retransfer, registration should be accurately carried out between the transfer portion in the intermediate transfer recording medium and the object. In this case, the front end of the object carried may be detected and registered with the transfer portion. Alternatively, a method may be used wherein a detection mark is formed on the object and the detection mark is read and registered with the transfer portion.

In particular, when a print is previously provided on the object in its portion, onto which the transfer portion is to be retransferred, at the time of the retransfer, the registration between the transfer portion in the intermediate transfer recording medium and the object should be accurately carried out by utilizing the above detection method.

(Method for Image Formation)

Next, the method for image formation according to the present invention, wherein, for example, when a desired object has a void portion or when the shape of the outer edge is complicate, a receptive layer-non-retransferred region is formed as a part of the object, using the above intermediate transfer recording medium, will be described.

A dye layer or a hot-melt ink layer is transferred, from a thermal transfer sheet, onto a receptive layer in the intermediate transfer recording medium comprising a substrate film and, separably provided on the substrate film, a transfer portion comprising at least a receptive layer by means of heating means such as a thermal head, to form an image. Next, the transfer portion with the image formed thereon in the intermediate transfer recording medium is retransferred onto an object by heating means such as a heat roll. At the time of the retransfer, the intermediate transfer recording medium in its portion provided with a masking layer is not transferred onto the object, and the other retransfer heated portion is retransferred.

In the method for image formation according to the present invention, the use of an intermediate transfer recording medium, wherein, for each unit picture plain partitioned by a detection mark, a non-retransfer region not to be transferred onto an object has been provided in a part of at least one side unit, a receptive layer-non-retransferred region and a receptive layer-retransferred region with an image thermally transferred thereon can be formed separately from each other on a part of one side or both sides of an object with accurate positional accuracy.

The detection mark is used for distinguishment of the transfer layer for the upper surface of the object or the transfer layer for the lower surface of the object (for example, by a method wherein the transfer layer for the upper surface of the object is distinguished from the transfer layer for the lower surface of the object by providing a detection mark of one stripe for any one of the transfer portions and a detection mark of two stripes for the other transfer portion, as shown in FIG. 12) or for the detection of the position of the layer. By virtue of this, at the time of the formation of an image on the object, a receptive layer-non-retransferred region can be provided on a specified surface. Further, the receptive layer with an image thermally transferred thereon can be accurately retransferred on a specified region while distinguishment from the non-retransferred portion. Furthermore, the edge of the receptive layer transferred onto the object is sharp, the portion not to be transferred is not transferred, and the receptive layer can be stably transferred.

Thus, the position of the thermally transferred image on the intermediate transfer recording medium can be registered with the retransfer position of the transfer portion onto the object by detecting the detection mark, provided in the intermediate transfer recording medium, with a detector on the printer side, and synchronizing the detection mark with a printer.

EXAMPLES

Example A1

A 12 μm-thick transparent polyethylene terephthalate film was first provided as a substrate film. The following coating liquid for a stripping layer was coated on the surface of the substrate film, and the coating was dried to form a stripping layer at a coverage of 2.0 g/m$^2$ on a dry basis on the whole area of the substrate film. In the following description, "parts" or "%" is by weight unless otherwise specified.

| (Coating liquid for stripping layer) | |
|---|---|
| Acrylic resin (BR-83, manufactured by Mitsubishi Rayon Co., Ltd.) | 88 parts |
| Polyester resin | 1 part |
| Polyethylene wax | 11 parts |
| Methyl ethyl ketone | 50 parts |
| Toluene | 50 parts |

Next, the following coating liquid for a receptive layer was coated in a pattern shown in FIGS. 1 and 2 onto the stripping layer, and the coating was dried to form a receptive layer pattern at a coverage of 2.0 g/m$^2$ on a dry basis (a transfer portion 103 having a void portion 108).

| (Coating liquid for receptive layer) | |
|---|---|
| Vinyl chloride-vinyl acetate copolymer | 40 parts |
| Acryl silicone | 1.5 parts |
| Methyl ethyl ketone | 50 parts |
| Toluene | 50 parts |

Further, a detection mark ink having the following composition was gravure printed in a pattern as shown in FIGS. 1 and 2 to form a detection mark at a coverage of 1.5 g/m$^2$ on a dry basis on the receptive layer. Thus, an intermediate transfer recording medium of Example A1 was prepared.

| (Detection mark ink) | |
|---|---|
| Carbon black | 8.0 parts |
| Urethane resin (HMS-20, manufactured by Nippon Polyurethane Industry Co., Ltd.) | 5.0 parts |
| Methyl ethyl ketone | 38.5 parts |
| Toluene | 38.5 parts |

Example A2

The same substrate film as used in Example A1 was provided. The same coating liquid for a stripping layer as used in Example A1 was coated onto the surface of the substrate film, and the coating was dried to form a stripping layer at a coverage of 2.0 g/m$^2$ on a dry basis on the whole area of the substrate film.

Next, the same coating liquid for a receptive layer as used in Example A1 was coated on the stripping layer, and the coating was dried to form a receptive layer in a blotted form as shown in FIGS. 3 and 4 at a coverage of 2.0 g/m$^2$ on a dry basis.

Next, a masking layer ink having the following composition was gravure printed in a pattern as shown in FIGS. 3 and 4 on the receptive layer to form a masking layer at a coverage of 2.0 g/m$^2$ on a dry basis.

| (Masking layer ink) | |
|---|---|
| Acrylic resin | 50 parts |
| Polyethylene wax | 50 parts |
| Methyl ethyl ketone | 25 parts |
| Toluene | 25 parts |

Further, the same detection mark ink as used in Example A1 was gravure printed in a pattern as shown in FIGS. 3 and 4 to form a detection mark at a coverage of 1.5 g/m$^2$ on a dry basis on the receptive layer. Thus, an intermediate transfer recording medium of Example A2 was prepared.

Example A3

The same substrate film as used in Example A1 was provided. The same detection mark ink as used in Example A1 was gravure printed in a pattern as shown in FIGS. 5 and 6 on the surface of the substrate film to form a detection mark at a coverage of 1.5 g/m$^2$ on a dry basis. Further, the same coating liquid for a stripping layer as used in Example A1 was coated, and the coating was dried to form a stripping layer having a given pattern, as shown in FIGS. 5 and 6, at a coverage of 2.0 g/m$^2$ on a dry basis on the whole area (on the detection mark) of the substrate film while partially ensuring a portion not provided with the stripping layer.

The same coating liquid for a receptive layer as used in Example A1 was then coated and superimposed on the stripping layer in the same pattern as in the stripping layer, as shown in FIGS. 5 and 6, and the coating was dried to form a receptive layer at a coverage of 2.0 g/m$^2$ on a dry basis. Thus, an intermediate transfer recording medium of Example A3 was prepared.

Example A4

The same substrate film as used in Example A1 was provided. A coating liquid for a release layer having the following composition was coated on the surface of the substrate film, and the coating was dried to form a release layer at a coverage of 2.0 g/m$^2$ on a dry basis on the whole area of the substrate film.

| (Coating liquid for release layer) | |
|---|---|
| Acrylic resin (BR-83, manufactured by Mitsubishi Rayon Co., Ltd.) | 88 parts |
| Polyester resin | 1 part |
| Polyethylene wax | 11 parts |
| Methyl ethyl ketone | 50 parts |
| Toluene | 50 parts |

The same masking layer ink as used in Example A2 was gravure printed in a pattern as shown in FIGS. 7 and 8 on the release layer to form a masking layer at a coverage of 2.0 g/m$^2$ on a dry basis.

Next, as shown in FIGS. 7 and 8, the same coating liquid for a receptive layer as used in Example A1 was coated on the masking layer and the release layer, and the coating was dried to form a receptive layer at a coverage of 2.0 g/m$^2$ on a dry basis.

Further, the same detection mark ink as used in Example A1 was gravure printed in a pattern as shown in FIGS. 7 and 8 to form a detection mark at a coverage of 1.5 g/m$^2$ on a dry basis on the receptive layer. Thus, an intermediate transfer recording medium of Example A4 was prepared.

A full-color photograph-like image was formed on the receptive layer (on the portion except for the receptive layer-non-formed portion and on the receptive layer in its portion not covered with the masking layer) in the intermediate transfer recording media of Examples A1 to A4. In the formation of the image, a commercially available thermal transfer printer loaded with a thermal head was used with a specialty thermal dye sublimation transfer sheet for the thermal transfer printer.

In the formation of the image, the detection mark was detected by the printer side to perform registration.

Thereafter, the transfer portion with the image formed thereon was retransferred by a commercially available laminator provided with a heat roll onto a 600 μm-thick white PET-G sheet (PET-G, DIAFIX PG-W, manufactured by Mitsubishi Plastic Industries Ltd.) at its predetermined position to prepare a print. In this case, in the transfer face of the PET-G sheet, positions corresponding to the place for hand writing of address and name and the place for seal had been previously subjected to sign panel treatment, and registration was carried out between the place for the sign panel and the masking layer portion for Examples A2 and A4 and the receptive layer-non-formed portion for Examples A1 and A3.

In the registration, the detection mark provided in the intermediate transfer recording medium and the front end in the carriage direction of the white PET-G sheet as an object were detected by means of the thermal transfer printer, followed by retransfer of the transfer portion in the intermediate transfer recording medium onto the object at its predetermined position.

The prints prepared in Examples A2 and A4 were such that, in the transfer portion of the intermediate transfer recording medium, only the masking layer-transferred portion was not transferred onto the object and the image was thermally transferred on the object in its portion except for void portions for the place for hand writing and the place for seal. An entry was made with a ballpoint pen in the place for hand writing. As a result, there was no unsharp portion at all.

Further, a seal was put with a vermilion inkpad on the place for seal. As a result, there was no unsharp portion at all. Furthermore, the thermally transferred image was sharp and had excellent quality.

The prints prepared in Examples A1 and A3 were such that, in the transfer portion of the intermediate transfer recording medium, only the portion not partially provided with the receptive layer was not transferred onto the object and the image was thermally transferred on the object in its portion except for void portions for the place for the hand writing and the place for seal. An entry was made with a ballpoint pen in the place for hand writing. As a result, there was no unsharp portion at all.

Further, a seal was put with a vermilion inkpad on the place for seal. As a result, there was no unsharp portion at all. Furthermore, the thermally transferred image was sharp and had excellent quality.

Comparative Example A1

The same substrate film as used in Example A1 was provided. The same coating liquid for a stripping layer as used in Example A1 was coated onto the surface of the substrate film, and the coating was dried to form a stripping layer at a coverage of 2.0 g/m² on a dry basis on the whole area of the substrate film. Next, the same coating liquid for a receptive layer as used in Example A1 was coated in a full density blotted form on the whole area of the stripping layer, and the coating was dried to form a receptive layer at a coverage of 2.0 g/m² on a dry basis.

Next, the same detection mark ink as used in Example A1 was gravure printed in a pattern shown in FIGS. 1 and 2 at a period of one unit picture plain onto the receptive layer to form a detection mark on the receptive layer at a coverage of 1.5 g/m² on a dry basis. Thus, an intermediate transfer recording medium of Comparative Example A1 was prepared.

On the receptive layer in the intermediate transfer recording medium were formed a photograph-like image by thermal dye sublimation transfer and a character image by thermal ink transfer. In this case, the same thermal transfer printer and thermal transfer sheet as used in the above examples were used.

Next, the same PET-G sheet as used in Example A1 was put on top of the transfer portion with the image formed thereon, and hot pressing was carried out by means of a hot stamping convex plate, having a predetermined pattern, which heats and presses the portion except for positions corresponding to the place for hand writing of address and name and the place for seal, where the transfer portion was retransferred onto the object to prepare a print.

For the print prepared in Comparative Example A1, an entry was made with a ballpoint pen in the place for hand writing. As a result, the ink was partially repelled, and an unsharp portion occurred. Further, when a seal was put with a vermilion inkpad on the place for seal, there was a portion where the ink for seal was partially repelled, and the seal was unsharp.

Example B1

The same substrate film as used in Example A1 was provided. The same coating liquid for a stripping layer as used in Example A1 was coated onto the surface of the substrate film, and the coating was dried to form a stripping layer at a coverage of 2.0 g/m² on a dry basis on the whole area of the substrate film.

Next, the same coating liquid for a receptive layer as used in Example A1 was coated on the stripping layer, and the coating was dried to form a receptive layer at a coverage of 2.0 g/m² on a dry basis.

The same masking layer ink as used in Example A2 was then gravure printed in a pattern as shown in FIG. 11 on the receptive layer to form a masking layer at a coverage of 2.0 g/m² on a dry basis.

Further, the same detection mark ink as used in Example A1 was gravure printed in a pattern as shown in FIG. 11 to form a detection mark at a coverage of 1.5 g/m² on a dry basis. Thus, an intermediate transfer recording medium of Example B1 was prepared.

A full-color photograph-like image was formed on the receptive layer (on the receptive layer in its portion not covered with the masking layer) in the intermediate transfer recording medium of Example B1 by means of a commercially available thermal transfer printer loaded with a thermal head using a specialty thermal dye sublimation transfer sheet for the thermal transfer printer.

In the formation of the image, the detection mark provided in the intermediate transfer recording medium was detected on the printer side to perform registration of the image on the receptive layer.

Thereafter, the transfer portion with the image formed thereon was retransferred by a commercially available laminator provided with a heat roll onto a 600 μm-thick white PET-G sheet (PET-G, DIAFIX PG-W, manufactured by Mitsubishi Plastic Industries Ltd.) at its predetermined position to prepare a print. In this case, in the transfer face of the PET-G sheet, positions corresponding to the place for hand writing of address and name and the place for seal had been previously subjected to sign panel treatment, and registration was carried out between the masking layer portion and the place for sign panel. In the retransfer of the transfer portion in the intermediate transfer recording medium onto the object, the detection mark provided in the intermediate transfer recording medium was detected by the printer side for registration.

The print prepared in Example 1 was such that, in the transfer portion of the intermediate transfer recording medium, only the masking layer-transferred portion was not transferred onto the object and the image was thermally transferred on the object in its portion except for void portions for the place for the hand writing and the place for seal. An entry was made with a ballpoint pen in the place for hand writing. As a result, there was no unsharp portion at all.

Further, a seal was put with a vermilion inkpad on the place for seal. As a result, there was no unsharp portion at all. Furthermore, the thermally transferred image was sharp and had excellent quality.

Example B2

The same substrate film as used in Example B1 was provided. The same coating liquid for a release layer as used in Example B1 was coated onto the surface of the substrate film, and the coating was dried to form a release layer at a coverage of 2.0 g/m$^2$ on a dry basis on the substrate film.

Next, the same coating liquid for a receptive layer as used in Example B1 was coated on the release layer, and the coating was dried to form a receptive layer at a coverage of 2.0 g/m$^2$ on a dry basis on the substrate film.

The same masking layer ink as used in Example B1 was gravure printed in a pattern as shown in FIG. 12 onto the receptive layer to form a masking layer at a coverage of 2.0 g/m$^2$ on a dry basis.

The same detection mark ink as used in Example B1 was gravure printed in a pattern as shown in FIG. 12 to form a detection mark at a coverage of 1.5 g/m$^2$ on a dry basis. Thus, a transfer layer A of an image formation unit for the upper surface of the object and a transfer layer B of an image formation unit for the lower surface of the object were alternately formed in ABABAB. The masking layer was formed on only the transfer layer B side of the image formation unit for the lower surface of the object.

Thus, an intermediate transfer recording medium of Example B2 was prepared.

On the transfer layer A of the image formation unit for the upper surface of the object in the intermediate transfer recording medium of Example B2 were formed, by means of the thermal transfer printer, thermally transferred images, i.e., a full-color, photograph-like image using the same specialty thermal dye sublimation transfer sheet as used in Example B1 and a thermally ink transferred character image using a thermal ink transfer sheet. Next, on the transfer portion B, to be transferred onto the back side (lower surface) of the object, adjacent to the transfer portion A to be transferred onto the top surface (upper surface) of the object was formed an thermally transferred image, i.e., a thermally ink transferred character image using the same thermal ink transfer sheet as used above by means of the thermal transfer printer. In this case, the thermally ink transferred character image was formed on the portion where the masking layer had not been printed.

In the formation of the image, the detection mark for the upper surface of the object in the intermediate transfer recording medium and the detection mark for the lower surface of the object were detected by the printer side to perform registration for the upper surface image and the lower surface image, on the receptive layer, to be transferred on the object.

Thereafter, the transfer portion with the image formed thereon for the upper surface of the object was retransferred by means of a commercially available laminator permanently provided with a heat roll onto a predetermined position of the upper surface of the same white PET-G sheet (object) as used in Example B1 to prepare a print.

The transfer portion with the image formed thereon for the lower surface of the object was then retransferred, by means of a commercially available laminator permanently provided with a heat roll, onto a predetermined position of the lower surface side of the white PET-G sheet with the image transferred on the upper surface thereof, whereby a print having an image on its both sides was prepared. In this case, in the transfer face as the lower surface of the PET-G sheet, the position corresponding to the place for hand writing of address and name was previously subjected to sign panel treatment, and registration was carried out between the masking layer portion and the place for sign panel. In the retransfer of the transfer portion in the intermediate transfer recording medium onto the object, the detection mark in the transfer layer for the upper surface of the object and the detection mark in the transfer layer for the lower surface of the object in the intermediate transfer recording medium each were detected by the printer side, and the transfer portions with the image formed thereon in the intermediate transfer recording medium were registered with and retransferred onto the object respectively in its predetermined portions of the upper and lower surfaces.

The print prepared in Example B2 was such that, on the lower surface of the object, only the masking layer-transferred portion in the transfer portion of the intermediate transfer recording medium was not transferred onto the object and the image was thermally transferred onto the object in its portion except for the void portion for the place for hand writing. An entry was made with a ballpoint pen in the place for hand writing. As a result, there was no unsharp portion at all.

Further, in the print prepared in Example B2, the thermally transferred images on the upper and lower surfaces of the print were sharp and had excellent quality.

Comparative Example B1

The same substrate film as used in Example B1 was provided. The same coating liquid for a release layer as used in Example B1 was coated onto the surface of the substrate film, and the coating was dried to form a release layer at a coverage of 2.0 g/m$^2$ on a dry basis on the substrate film. Next, the same coating liquid for a receptive layer as used in Example B1 was coated on the release layer, and the coating was dried to form a receptive layer at a coverage of 2.0 g/m$^2$ on a dry basis on the substrate film. Thus, an intermediate transfer recording medium of Comparative Example B1 was prepared.

On the receptive layer in the intermediate transfer recording medium were formed thermally transferred images, i.e., a photograph-like image by thermal dye sublimation transfer and a character image by thermal ink transfer. In this case, the same thermal transfer printer and thermal transfer sheet as used in Example B1 were used.

Next, the same PET-G sheet as used in Example B1 was put on top of the transfer portion with the image formed thereon, and hot pressing was carried out by means of a hot stamping convex plate, having a predetermined pattern, which heats and presses the portion except for positions corresponding to the place for hand writing of address and name and the place for seal, where the transfer portion was retransferred onto the object to prepare a print.

For the print prepared in Comparative Example B1, an entry was made with a ballpoint pen in the place for hand writing. As a result, the ink was partially repelled, and an unsharp portion occurred. Further, when a seal was put with a vermilion inkpad on the place for seal, there was a portion where the ink for seal was partially repelled, and the seal was unsharp.

Example C1

The same substrate film as used in Example A1 was provided. The same coating liquid for a stripping layer as used in Example A1 was coated onto the surface of the substrate film, and the coating was dried to form a stripping layer at a coverage of 2.0 g/m$^2$ on a dry basis on the whole area of the substrate film.

Next, the same coating liquid for a receptive layer as used in Example A1 was coated on the stripping layer, and the coating was dried to form a receptive layer at a coverage of 2.0 g/m$^2$ on a dry basis. Thus, an intermediate transfer recording medium of Example C1 was prepared.

A commercially available thermal transfer sheet comprising a 6 μm-thick polyethylene terephthalate as the substrate film and, repeatedly provided in a face serial manner on the substrate film, dye layers of yellow, magenta, and cyan and a thermally ink transferable layer having a black hue was provided. The substrate film had on its backside a previously formed backside layer.

At a predetermined position on the receptive layer of the intermediate transfer recording medium prepared in Example C1 were formed thermally transferred images by thermal transfer, i.e., a photograph-like image by thermal dye sublimation transfer and a thermally ink transferred character image using the thermal transfer sheet as provided above by means of a commercially available thermal transfer printer loaded with a thermal head. In this case, portions not provided with the receptive layer (a receptive layer-non-retransfer region) on the substrate film in the intermediate transfer recording medium, i.e., void portions in the transfer portion, correspond to the place for hand writing of address and name and the place for seal after transfer onto the object. That is, after transfer, hand writing and seal were carried out.

Thereafter, the transfer portion with the image formed thereon (a portion, shown in FIG. 13, sandwiched between two boundary portions 307) was retransferred by a commercially available laminator permanently provided with a heat roll onto a 600 μm-thick white PET-G sheet (PET-G, DIA-FIX PG-W, manufactured by Mitsubishi Plastic Industries Ltd.) at its predetermined position to prepare a print. In this case, in the transfer face of the PET-G sheet, positions corresponding to the place for hand writing of address and name and the place for seal had been previously subjected to sign panel treatment.

The print prepared in Example C1 was such that, in the transfer portion of the intermediate transfer recording medium, only the portion not provided with the receptive layer was not transferred onto the object and the image was thermally transferred on the object in its portion except for void portions for the place for the hand writing and the place for seal. An entry was made with a ballpoint pen in the place for hand writing. As a result, there was no unsharp portion at all.

Further, a seal was put with a vermilion inkpad on the place for seal. As a result, there was no unsharp portion at all. Furthermore, the thermally transferred image was sharp and had excellent quality.

Example C2

The same substrate film as used in Example C1 was provided. The same coating liquid for a stripping layer as used in Example C1 was coated on the substrate film in the same manner as in Example C1 to form a stripping layer on the whole area of the substrate film. The same coating liquid for a receptive layer as used in Example C1 was coated in a pattern as shown in FIG. 14 on the stripping layer, and the coating was dried to form a receptive layer pattern at a coverage of 2.0 g/m$^2$ on a dry basis. Next, the same detection mark ink as used in Example A1 was coated in a pattern shown in FIG. 14, and the coating was dried to form a detection mark at a coverage of 2.0 g/m$^2$ on a dry basis. Thus, an intermediate transfer recording medium of Example C2 was prepared.

At a predetermined position on the receptive layer of the intermediate transfer recording medium prepared in Example C2 were formed a photograph-like image by thermal dye sublimation transfer and a thermally ink transferred character image using the same thermal transfer sheet as used in Example C1 and the same thermal transfer printer as used in Example C1. In this case, in the formation of the thermally transferred image, the detection mark in the intermediate transfer recording medium was read by a detector in the printer to form the image on the receptive layer in its predetermined position.

In this case, portions not provided with the receptive layer (a receptive layer-non-retransfer region) on the substrate film in the intermediate transfer recording medium, i.e., void portions in the transfer portion, correspond to the place for hand writing of address and name and the place for seal after transfer onto the object. That is, after transfer, hand writing and seal were carried out.

Thereafter, the transfer portion with the image formed thereon (a portion, shown in FIG. 14, sandwiched between two detection marks 308) was retransferred by a commercially available laminator permanently provided with a heat roll onto the same white PET-G sheet as used in Example C1 at its predetermined position to prepare a print. In this case, in the transfer face of the PET-G sheet, positions corresponding to the place for hand writing of address and name and the place for seal had been previously subjected to sign panel treatment.

The print prepared in Example C2 was such that, in the transfer portion of the intermediate transfer recording medium, only the portion not provided with the receptive layer was not transferred onto the object and the image was thermally transferred on the object in its portion except for void portions for the place for the hand writing and the place for seal. An entry was made with a ballpoint pen in the place for hand writing. As a result, there was no unsharp portion at all.

Further, a seal was put with a vermilion inkpad on the place for seal. As a result, there was no unsharp portion at all. Furthermore, the thermally transferred image was sharp and had excellent quality.

Example C3

The same substrate film as used in Example C1 was provided. The same coating liquid for a stripping layer as used in Example C1 was coated on the substrate film in the same manner as in Example C1 to form a stripping layer on the whole area of the substrate film. The same coating liquid for a receptive layer as used in Example C1 was coated in a pattern as shown in FIG. 15 on the stripping layer, and the coating was dried to form a receptive layer pattern at a coverage of 2.0 g/m² on a dry basis. Next, the same detection mark ink as used in Example C2 was coated in a pattern shown in FIG. 15, and the coating was dried to form a detection mark at a coverage of 2.0 g/m² on a dry basis. Thus, an intermediate transfer recording medium of Example C3 was prepared.

In order to form images on the receptive layer in the intermediate transfer recording medium prepared in Example C3, the same thermal transfer sheet as used in Example C1 and the same thermal transfer printer as used in Example C1 were provided, and a thermally dye sublimation transferred photograph-like image was formed on a transfer layer A in its predetermined position for the upper surface of the object, while a thermally ink transferred character image was formed on a transfer layer B in its predetermined position for the lower surface of the object. In the formation of the thermally transferred images, the detection mark of the intermediate transfer recording medium was read with a detector of the printer to distinguish the transfer layer A for the upper surface of the object from the transfer layer B for the lower surface of the object and to detect the positions of the transfer layers A and B.

In this case, portions not provided with the receptive layer (a receptive layer-non-retransfer region) on the substrate film in the intermediate transfer recording medium, i.e., void portions in the transfer portion, correspond to the place for hand writing of address and name and the place for seal after transfer onto the object. That is, after transfer, hand writing and seal were carried out.

Thereafter, the transfer portion with the image formed thereon (transfer layers A and B, shown in FIG. 14, sandwiched between two detection marks 308) was retransferred by a commercially available laminator permanently provided with a heat roll onto the same white PET-G sheet as used in Example C1 at its predetermined position to prepare a print. In this case, the transfer layer A for the upper surface of the object was retransferred onto the upper surface of the white PET-G sheet, while the transfer layer B for the lower surface of the object was retransferred onto the lower surface of the white PET-G sheet. Further, in the transfer face in the backside of the PET-G sheet, positions corresponding to the place for hand writing of address and name and the place for seal had been previously subjected to sign panel treatment.

The print prepared in Example C3 was such that in the transfer portion of the intermediate transfer recording medium, only the portion not provided with the receptive layer was not transferred onto the lower surface side of the object and the image was thermally transferred on the object in its portion except for void portions for the place for the hand writing and the place for seal. In this case, the position of the thermally transferred image relative to the object was accurate. On the other hand, on the upper surface side of the print, the thermally transferred image was formed on the object with a good positional accuracy. An entry was made with a ballpoint pen in the place for hand writing. As a result, there was no unsharp portion at all.

Further, a seal was put with a vermilion inkpad on the place for seal. As a result, there was no unsharp portion at all. Furthermore, for both sides of the print, the thermally transferred image was sharp and had excellent quality.

Comparative Example C1

The same substrate film as used in Example C1 was provided. The same coating liquid for a stripping layer as used in Example C1 was coated on the substrate film in the same manner as in Example C1 to form a stripping layer on the whole area of the substrate film. The same coating liquid for a receptive layer as used in Example C1 was coated in a full density blotted pattern on the stripping layer, and the coating was dried to form a receptive layer at a coverage of 2.0 g/m² on a dry basis. Thus, an intermediate transfer recording medium of Comparative Example C1 was prepared.

At a predetermined position on the receptive layer of the intermediate transfer recording medium prepared in Comparative Example C1 were formed a photograph-like image by thermal dye sublimation transfer and a thermally ink transferred character image using the same thermal transfer sheet as used in Example C1 and the same thermal transfer printer as used in Example C1.

Next, the same PET-G sheet as used in Example C1 was put on top of the transfer portion with the image formed thereon, and hot pressing was carried out by means of a hot stamping convex plate, having a predetermined pattern, which hot presses in such a manner that positions corresponding to the place for hand writing of address and name and the place for seal, are not transferred, thereby the transfer portion was retransferred onto the object to prepare a print.

For the print prepared in Comparative Example C1, an entry was made with a ballpoint pen in the place for hand writing. As a result, the ink was partially repelled, and an unsharp portion occurred. Further, when a seal was put with a vermilion inkpad on the place for seal, there was a portion where the ink for seal was partially repelled, and the seal was unsharp.

Further, the hot stamping convex plate used in Comparative Example C1 was of a single pattern type, and the formation of a varied pattern was impossible. That is, the applicability of the hot stamping convex plate was poor.

What is claimed is:

1. An intermediate transfer recording medium, comprising:
   a substrate film; and
   a transfer portion provided separately on the substrate film, the transfer portion comprising a receptive layer and
   at least one partial masking layer;
   wherein when the transfer portion is retransferred onto an object, a receptive region and a void region are formed on the object, the void region being substantially free of the receptive layer and having a location corresponding to a location during retransfer of the partial masking layer.

2. The intermediate transfer recording medium according to claim 1, further comprising at least one detection mark provided on the intermediate transfer recording medium at a predetermined distance from the at least one partial masking layer.

3. The intermediate transfer recording medium according to claim 1, further comprising:
   at least one first side region for forming an image on a first side of an object;
   at least one second side region for forming an image on a second side of the object; and at least one detection mark separating the at least one first side region from the at least one second side region;
wherein:
the partial masking layer is provided in at least one of the first side region and the second side region; and
when forming an image on both sides of the object, a void region is formed on at least one side of the object, the void region being substantially free of the receptive layer and having a location corresponding to a location during retransfer of the partial masking layer.

4. A method for image formation, comprising forming the void region on a part of the object using the intermediate transfer recording medium according to claim 1.

5. An intermediate transfer recording medium, comprising:
a substrate film;
a stripping layer provided on the substrate film; and
a receptive layer provided on the stripping layer;
wherein:
at least a portion of the substrate film is not provided with the stripping layer; and
when the receptive layer is retransferred onto an object, a void region is formed on the object, the void region being substantially free of the receptive layer and having a location corresponding to a location during retransfer of the portion of the substrate film not provided with the stripping layer.

6. The intermediate transfer recording medium according to claim 5, further comprising a detection mark provided on the intermediate transfer recording medium at a predetermined distance from the portion of the substrate film is not provided with the stripping layer.

7. A method for image formation, comprising forming the void region on a part of the object using the intermediate transfer recording medium according to any one of claims 5 and 6.

8. A method for image formation using an intermediate transfer recording medium, comprising:
providing an intermediate transfer recording medium comprising a substrate film, a stripping layer provided on the substrate film and a receptive layer provided on the stripping layer;
providing a thermal transfer sheet comprising a thermally transferable masking layer;
transferring the masking layer onto the receptive layer by heating means; and
retransferring the receptive layer through the masking layer onto an object to form a receptive region and a void region on the object, the void region being substantially free of the receptive layer.

* * * * *